United States Patent
Sheu et al.

(10) Patent No.: US 10,985,625 B2
(45) Date of Patent: Apr. 20, 2021

(54) MOTOR STATOR AND FORMING METHOD THEREOF

(71) Applicant: DELTA ELECTRONICS, INC., Taoyuan (TW)

(72) Inventors: Hong-Cheng Sheu, Taoyuan (TW); Hsing-Cheng Lin, Taoyuan (TW); Chia-Hsing Chien, Taoyuan (TW); Yi-No Chen, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 95 days.

(21) Appl. No.: 16/449,460

(22) Filed: Jun. 24, 2019

(65) Prior Publication Data
US 2020/0112218 A1    Apr. 9, 2020

(30) Foreign Application Priority Data
Oct. 9, 2018 (CN) .......................... 201811172967.2

(51) Int. Cl.
*H02K 3/28* (2006.01)
*H02K 3/12* (2006.01)

(52) U.S. Cl.
CPC .................. *H02K 3/28* (2013.01); *H02K 3/12* (2013.01)

(58) Field of Classification Search
CPC .......... H02K 3/28; H02K 3/12; H02K 15/064; H02K 1/16; H02K 15/085; H02K 3/00–3/528
See application file for complete search history.

(56) References Cited

U.S. PATENT DOCUMENTS

| 5,998,903 A * | 12/1999 | Umeda ................. H02K 1/243 310/179 |
| 6,181,044 B1 * | 1/2001 | Umeda .................... H02K 3/12 29/596 |
| 6,894,417 B2 | 5/2005 | Cai et al. |
| 7,034,428 B2 | 4/2006 | Cai et al. |
| 7,622,843 B2 | 11/2009 | Cai |
| 2013/0221773 A1 * | 8/2013 | Chamberlin ............. H02K 5/20 310/58 |
| 2014/0035404 A1 | 2/2014 | Hamer et al. |

(Continued)

FOREIGN PATENT DOCUMENTS

| CN | 101490933 A | 7/2009 |
| WO | 2013126637 A1 | 8/2013 |

*Primary Examiner* — Thomas Truong
(74) *Attorney, Agent, or Firm* — CKC & Partners Co., LLC

(57) ABSTRACT

A motor stator structure includes a core and plural hairpin wires. The core has slots, an insertion side, and an extension side. Each slot has an innermost layer, a second inner layer, a second outer layer and an outermost layer configured in a radial direction of the core. The hairpin leg protruding from the innermost layer extends for a first span distance, the hairpin leg protruding from the second inner layer extends for a second span distance, the hairpin leg protruding from the second outer layer extends for a third span distance, and the hairpin leg protruding from the outermost layer extends for a fourth span distance. The first span distance is different from the second span distance. The third span distance is different from the fourth span distance. The first and fourth span distances are substantially the same. The second and third span distances are substantially the same.

18 Claims, 20 Drawing Sheets

(56) References Cited

U.S. PATENT DOCUMENTS

2014/0184011 A1\* 7/2014 Kaimori ................... H02K 3/12
                                                          310/185
2019/0222078 A1\* 7/2019 Liang ................. H02K 15/0414
2019/0288574 A1\* 9/2019 Leonardi .................. H02K 3/28

\* cited by examiner

MOTOR STATOR AND FORMING METHOD THEREOF

CROSS-REFERENCE TO RELATED APPLICATION

This application claims priority to China Application Serial Number 201811172967.2, filed Oct. 9, 2018, which is herein incorporated by reference in its entirety.

BACKGROUND

Field of Invention

The present disclosure relates to a motor stator and manufacturing method thereof, and more particularly to a motor stator including hairpin wires and manufacturing method thereof.

Description of Related Art

A conventional motor stator with the hairpin wires has a wire winding configuration that generally enable its wires to extend across the same number of slots after protruding out of slots such that gaps between adjacent layers of wires are uniform. When the electrical current passing through the wires of the motor stator is becoming larger or space occupied by the motor stator is becoming smaller, heat dissipation or safety insulation issues associated with the hairpin wires within the motor stator need to be considered.

SUMMARY

The present disclosure proposes a motor stator and a forming method for overcoming or alleviating the problems of the prior art.

In one or more embodiments, a motor stator comprises a core and a plurality of hairpin wires. The core comprises a plurality of slots, an insertion side and an extension side opposite to the insertion side, wherein each slot comprises an innermost layer, a second inner layer, a second outer layer, and an outermost layer, configured in a radial direction of the core. The hairpin wires are configured to be inserted into the slots from the insertion side and protruded out of the slots from the extension side and bent in a circumferential direction of the core and extended over a span distance. The hairpin wires comprise a plurality of hairpin legs each inserted into one of the innermost layer, second inner layer, second outer layer, and outermost layer, wherein the hairpin legs protrude out at the extension side and are connected to form a winding set. the hairpin wires protruding out of the innermost layer extend over a first span distance, the hairpin wires protruding out of the second inner layer extend over a second span distance, the hairpin wires protruding out of the second outer layer extend over a third span distance, and the hairpin wires protruding out of the outermost layer extend over a fourth span distance, wherein the first span distance and the second span distance are different, and the third span distance and the fourth span distance are different. The first span distance and the fourth span distance are substantially the same, and the second span distance and the third span distance are substantially the same.

In one or more embodiments, a motor stator comprises a core and a plurality of first winding set wires and second winding set hairpin wires. The core comprises a plurality of slots, an insertion side and an extension side opposite to the insertion side, wherein each slot comprises a first layer, a second layer, a third layer, and an fourth layer, configured from inner to outer in a radial direction of the core. Each first winding set wire comprises a first leg and a second leg, wherein each first leg is inserted into the first layer of the slots from the insertion side and protruded out of the slots from the extension side and bent in a first direction and extended over a first span distance, wherein each second leg is inserted into the second layer of the slots from the insertion side and protruded out of the slots from the extension side and bent in a second direction and extended over a second span distance, wherein the first span distance is different from the second span distance, and wherein an immediately-adjacent pair of the first leg and the second leg is connected to form a first winding set. Each second winding set wire comprises a third leg and a fourth leg, wherein each third leg is inserted into the third layer of the slots from the insertion side and protruded out of the slots from the extension side and bent in a third direction and extended over a third span distance, wherein each fourth leg is inserted into the fourth layer of the slots from the insertion side and protruded out of the slots from the extension side and bent in a fourth direction and extended over a fourth span distance, wherein the third span distance is different from the fourth span distance, and wherein an immediately-adjacent pair of the fourth leg and the third leg is connected to form a second winding set.

In one or more embodiments, a motor stator forming method includes the following steps of providing a core comprising a plurality of slots, an insertion side and an extension side opposite to the insertion side, wherein each slot comprises an innermost layer, a second inner layer, a second outer layer, and an outermost layer, configured in a radial direction of the core; inserting a plurality of first winding set hairpin wires into the slots from the insertion side and protruding a plurality of first and second legs of the first winding set hairpin wires out of the slots from the extension side, wherein the plurality of first legs protrude out of the innermost layer of the slots and the plurality of second legs protrude out of the second inner layer of the slots; inserting a plurality of second winding set hairpin wires into the slots from the insertion side and protruding a plurality of third and fourth legs of the second winding set hairpin wires out of the slots from the extension side, wherein the plurality of third legs protrude out of the second outer layer of the slots and the plurality of fourth legs protrude out of the outermost layer of the slots; bending each of the first legs in a first direction such that it extends over a first span distance; bending each of the second legs in a second direction such that it extends over a second span distance; bending each of the third legs in a third direction such that it extends over a third span distance; bending each of the fourth legs in a fourth direction such that it extends over a fourth span distance, wherein the first span distance is different from the second span distance and the third span distance is different from the fourth span distance, and wherein the first span distance is substantially equal to the fourth span distance and the second span distance is substantially equal to the third span distance.

Hairpin wires disclosed in one or more embodiments of the motor stators protrude from the extension side of the iron core and bend in different configurations or extend over different span distances, for the innermost layer, the second inner layer, the second outer layer and the outermost layer of the slots. The configurations may enhance the heat dissipation efficiency whilst meeting the minimum safety insulation design requirements.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
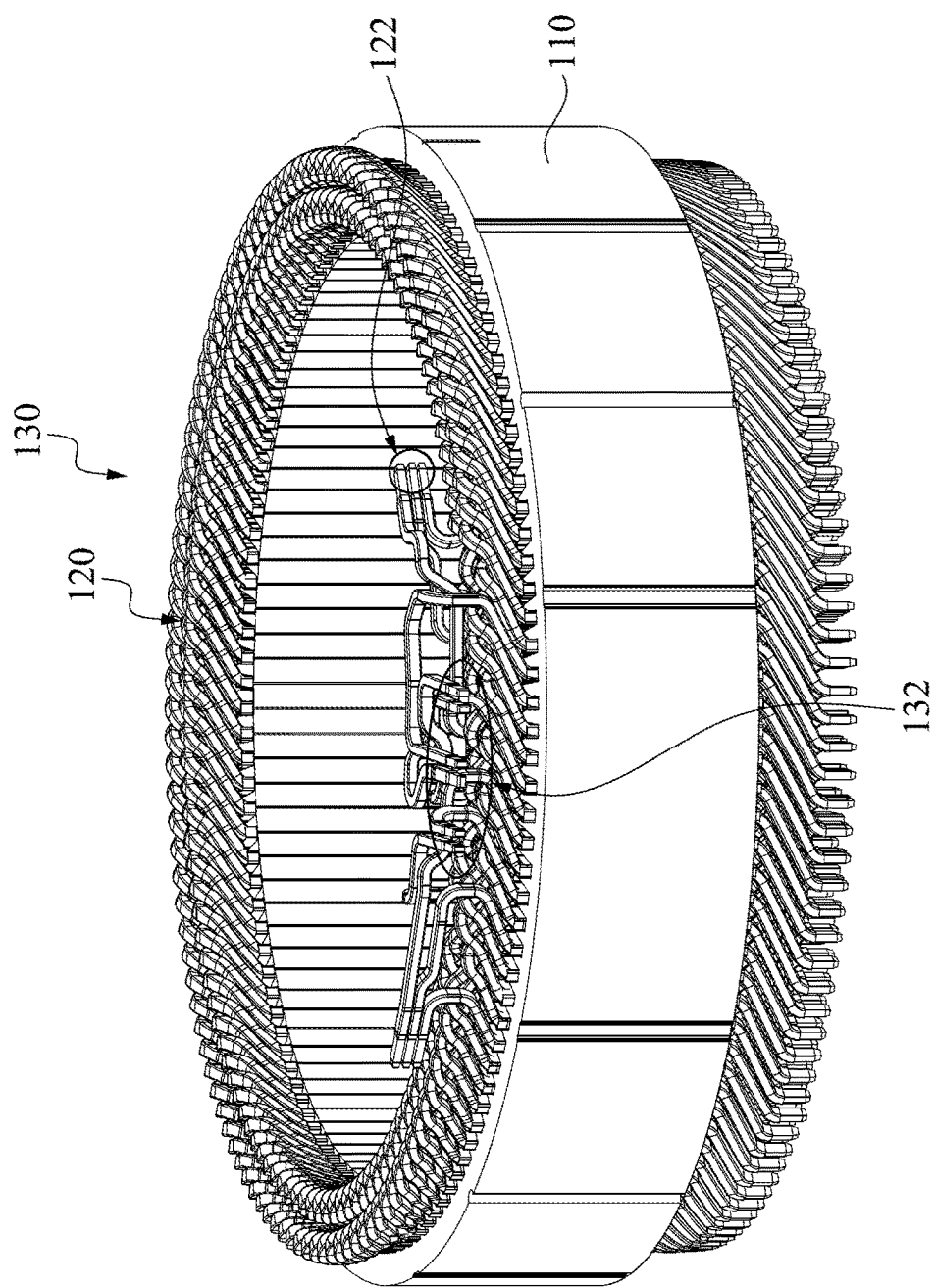
FIG. 1 illustrates a perspective view of a motor stator according to an embodiment of the present disclosure.

Reference will now be made in detail to the present embodiments, examples of which are illustrated in the accompanying drawings. Wherever possible, the same reference numbers are used in the drawings and the description to refer to the same or like parts.

Figure 2:
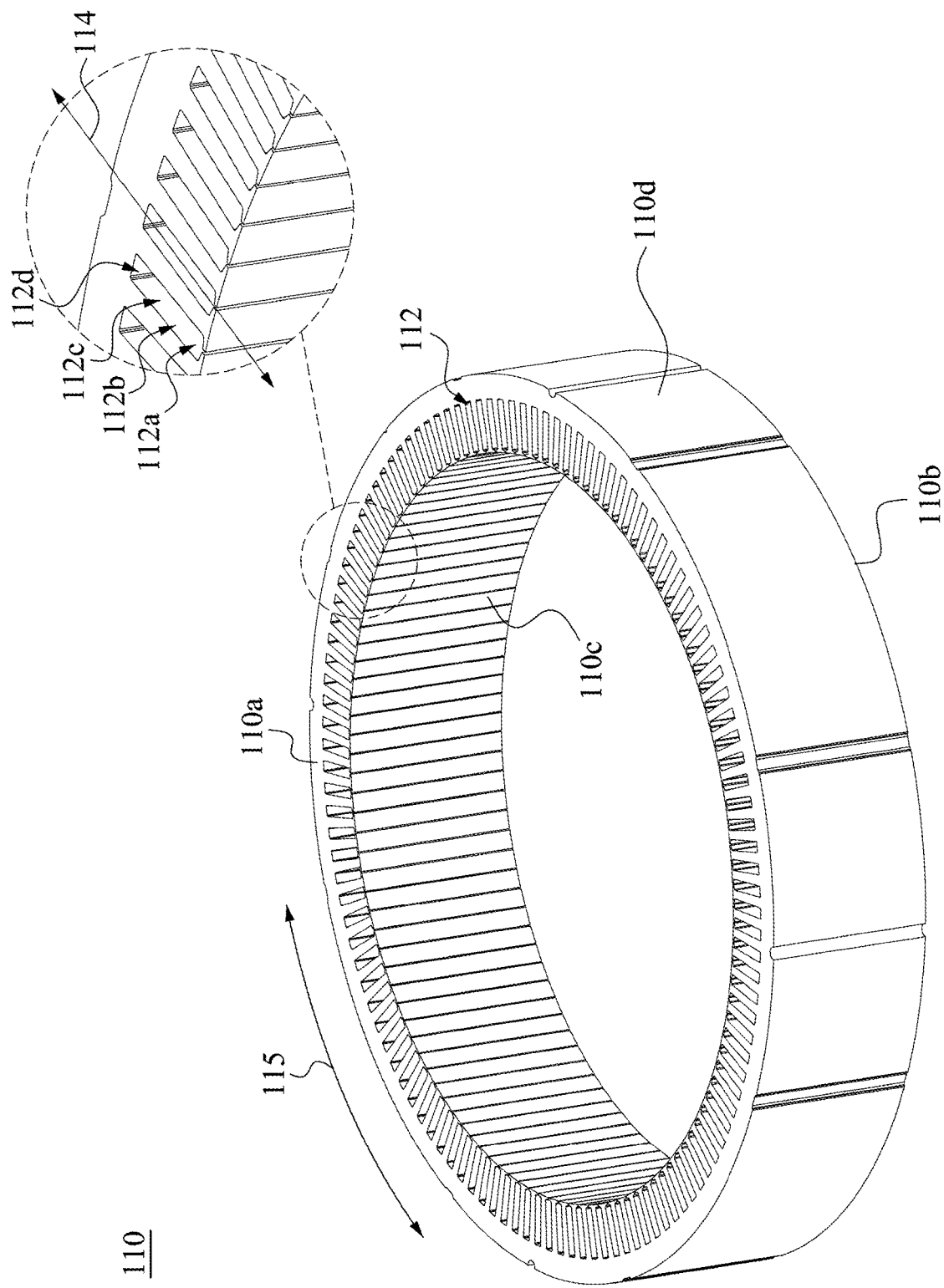
FIG. 2 illustrates a perspective view of an iron core in a motor stator according to an embodiment of the present disclosure.
Figure 3:
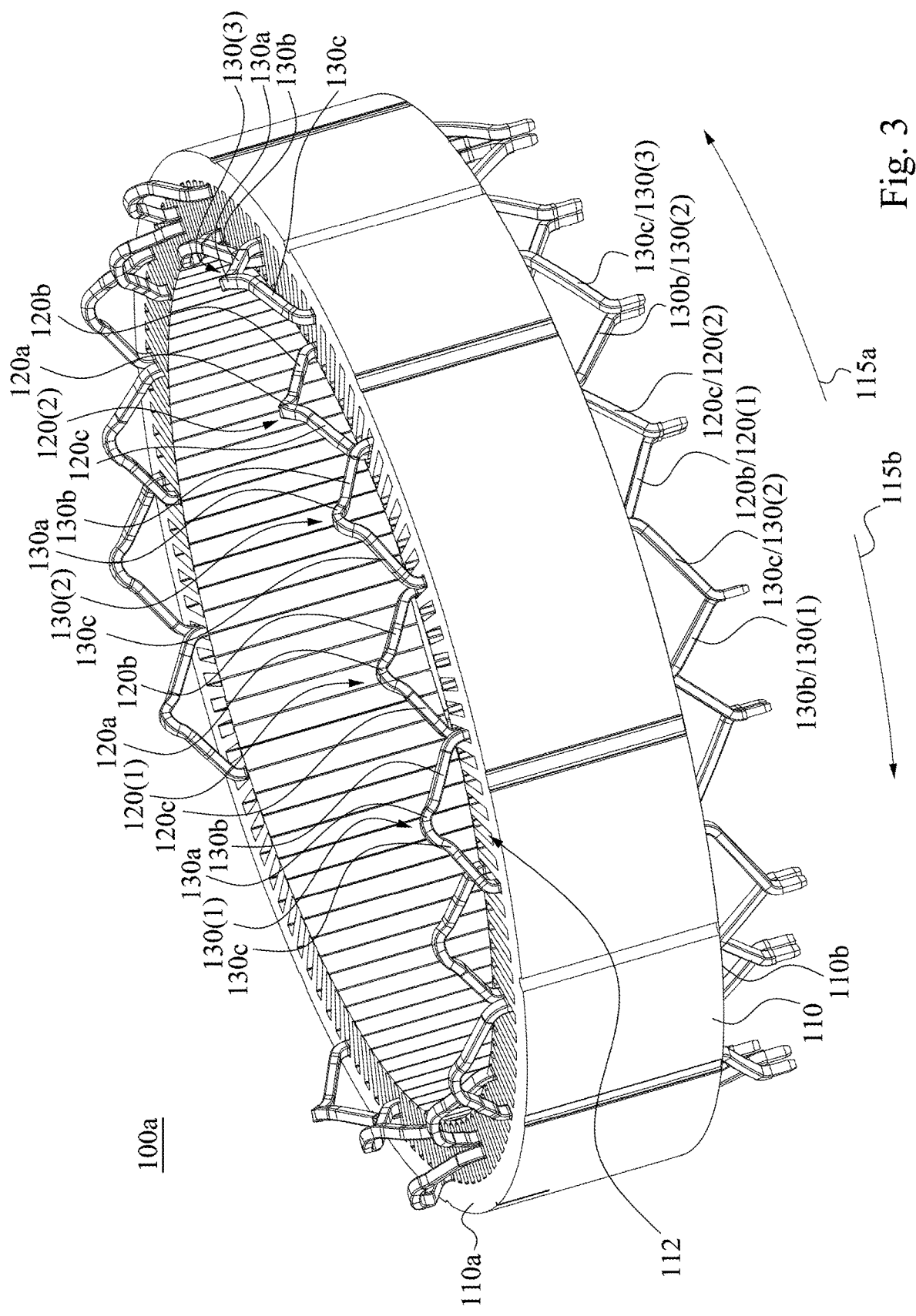
FIG. 3 illustrates a perspective view of an iron core with hairpin wires inserted according to an embodiment of the present disclosure.

Reference is made to FIGS. 1 and 2 showing a motor stator 100 which includes an iron core 110 and a plurality of hairpin wires inserted, e.g., hairpin wires (120, 130). The iron core 110 includes a plurality of slot 112 allowing the hairpin wires to be inserted. In this embodiment, slots 112 have a quantity of 120 slots. In other embodiments, slots 112 can have a quantity of 60 slots or 48 slots. The number of slots can be configured according to the design requirements of the motor stator, and is not limited to the aforementioned numbers. Within the limits of the design requirements, configuring more slots may result in a denser wire configuration such that the gap between adjacent wires is smaller. Accordingly, the number of slots, slot layers, cross-slot distance of the wire legs and/or the wire connection configuration are factors that need to be considered for designing a motor stator. The iron core 110 has an insertion side 110a and an extension side 110b opposite to the insertion side 110a. For clarity of reference, the insertion side 110a and extension side 110b may be respectively referred to as an upper side and a lower side of the iron core 110. Each slot 112 has an innermost layer 112a, a second inner layer 112b, a second outer layer 112c and an outermost layer 112d, configured in a radial direction 114 of the iron core 110. The innermost layer 112a, the second inner layer 112b, the second outer layer 112c and the outermost layer 112d are also herein defined as a first layer, a second layer, a third layer and an fourth layer, configured from inner to outer in a radial direction 114 of the iron core 110. The radial direction 114 is substantially perpendicular to a circumferential direction 115 of the iron core 110.

Slots 112 may be configured with different number of layers, and are not limited to the above mentioned four layers. For example in other embodiments, when each slot accommodates more than six layers of wires, the innermost layer and second inner layer may be referred as the first layer and the second layer of the iron core from inner to outer, and the second outer layer and the outermost layer may be referred as the fifth layer and the sixth layer of the iron core from inner to outer. When each slot accommodates more than eight layers of wires, the innermost layer and second inner layer may be referred as the first layer and the second layer of the iron core from inner to outer, and the second outer layer and the outermost layer may be referred as the seventh layer and eighth layer of the iron core from inner to outer.

Reference is made to FIGS. 3, 4A, 4B and 5. The motor stator 100a includes an iron core 110 and a plurality of hairpin wire inserted into thereof. To better illustrate the configuration of the hairpin wires inserted into the iron core, bent, and connected, only a number of hairpin wires are illustrated here, instead of complete hairpin winding for example as shown in FIG. 1.

The motor stator 100a includes a plurality of hairpin wires 120 and a plurality of hairpin wires 130. Each hairpin wire 120 has a U-shaped portion 120a and two legs (120b, 120c), and the U-shaped portion 120a interconnects between the two legs (120b, 120c). Each leg 120b is inserted into the innermost layer of the slots from the insertion side 110a of the iron core 110 and protruded out of the slots 112 from the extension side 110b of the iron core 110, and bent in a direction 115a and extended over a span distance. Each leg 120c is inserted into the second inner layer of the slots 112 from the insertion side 110a of the iron core 110 and protruded out of the slots from the extension side 110b of the iron core 110, and bent in a direction 115b and extended over a span distance.

In this embodiment, a span distance of each leg 120b across the slots in the innermost layer is greater than a span distance of each leg 120c across the slots in the second inner layer. Each leg 120b is connected to an immediately-adjacent leg 120c to form a winding set, e.g., a leg 120b of the hairpin wire 120(1) is connected to an immediately-adjacent leg 120c of the hairpin wire 120(2) at the extension side 110b of the iron core 110 to form a winding set along the innermost layer and the second inner layer of the slots 112.

Each hairpin wire 130 has a U-shaped portion 130a and two legs (130b, 130c), and the U-shaped portion 130a interconnects between two legs (130b, 130c). Each leg 130b is inserted into the second outer layer of the slots 112 from the insertion side 110a of the iron core 110 and protruded out of the slots 112 from the extension side 110b of the iron core 110, and bent in the direction 115a and extended over a span distance. Each leg 130c is inserted into the outermost layer of the slots 112 from the insertion side 110a of the iron core 110 and protruded out of the slots from the extension side 110b of the iron core 110, and bent in a direction 115b and extended over a span distance.

In this embodiment, a span distance of each leg 130c across the slots in the outermost layer is greater than a span distance of each leg 130b across the slots in the second outer layer. Each leg 130b is connected to an immediately-adjacent leg 130c to form a winding set, e.g., a leg 130b of the hairpin wire 130(1) is connected to an immediately-adjacent leg 130c of the hairpin wire 130(2) at the extension side 110b of the iron core 110 to form a winding set along the outermost layer and the second outer layer of the slots 112.

Figure 4A:
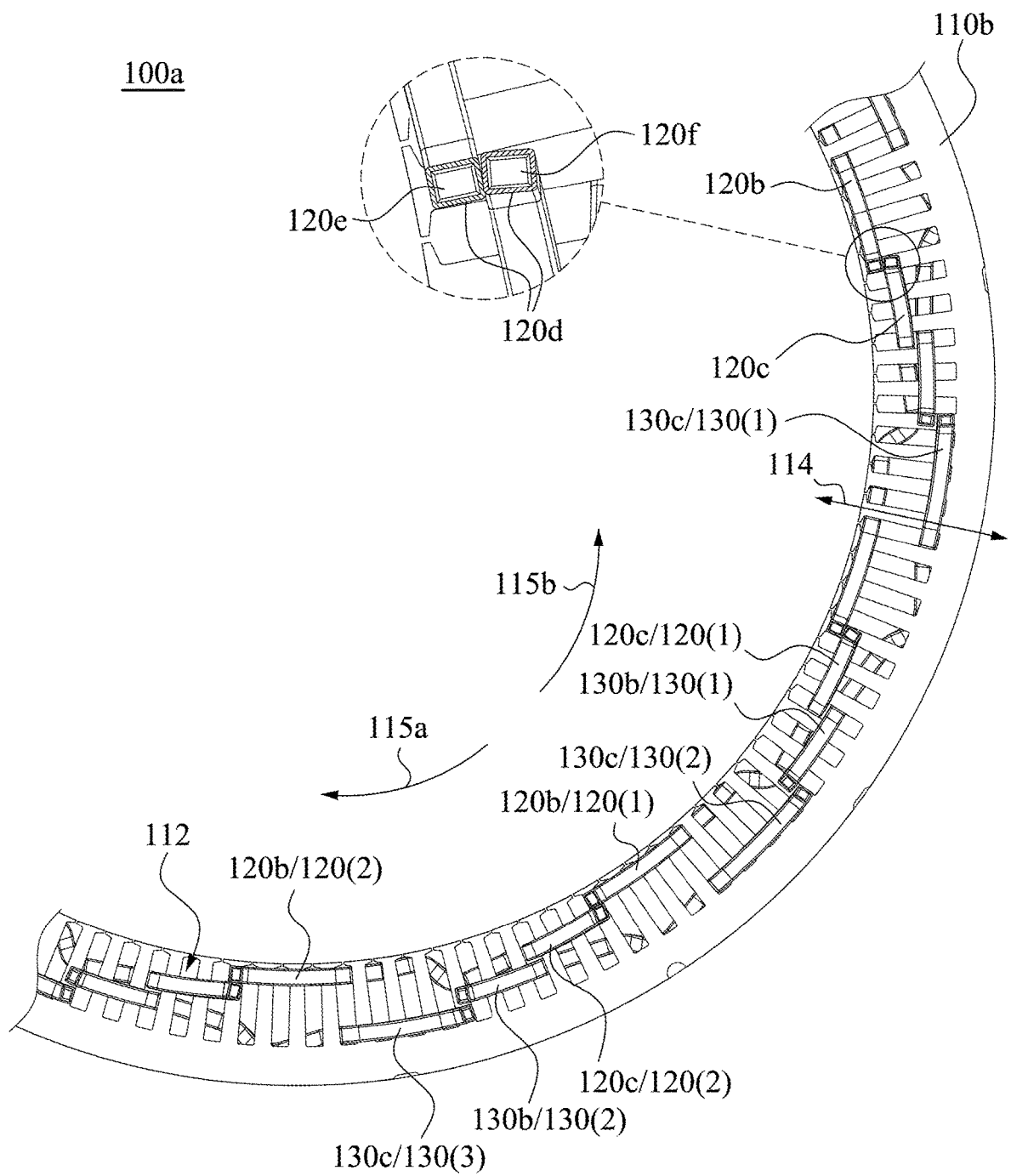
FIG. 4A illustrates a bottom view of the iron core with hairpin wires inserted as shown in FIG. 3.

In this embodiment, as illustrated in FIG. 4A, a span distance of each leg 120b across the slots in the innermost layer and a span distance of each leg 130c across the slots in the outermost layer are about 3.5 slots while a span distance of each leg 120c across the slots in the second inner layer and a span distance of each leg 130b across the slots in the second outer layer are about 2.5 slots, but not being limited thereto.

Figure 4B:
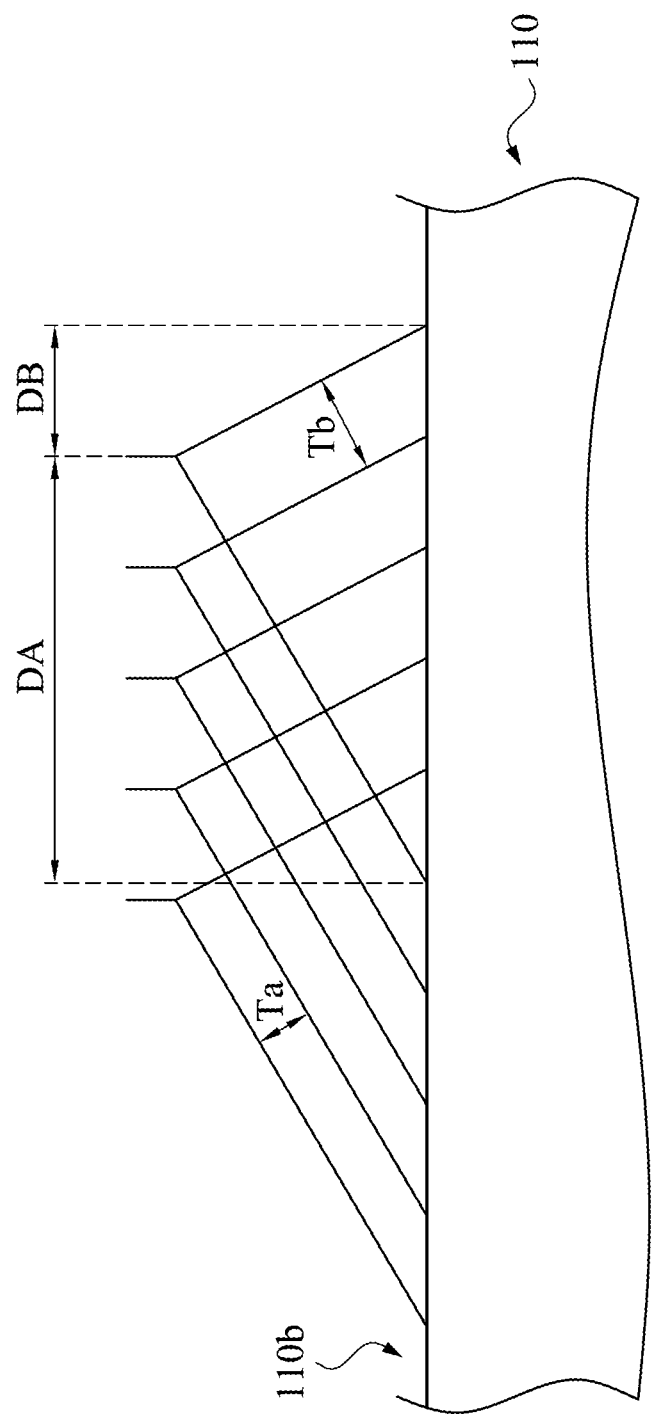
FIG. 4B illustrates the hairpin wires with labeled span distances and gaps.

As illustrated in FIG. 4A and FIG. 4B, when a hairpin wire has its span distance DB smaller than its span distance DA, an inclined gap Tb is greater than an inclined gap Ta.

In this embodiment, because the span distance of each leg 120b across the slots in the innermost layer is greater than the span distance of each leg 120c across the slots in the second inner layer, and the span distance of each leg 130c across the slots in the outermost layer is greater than the span distance of each leg 130b across the slots in the second outer layer, an inclined gap, e.g., Ta, between adjacent hairpin wires in the innermost layer and outermost layer is smaller than an inclined gap, e.g., Tb, between adjacent hairpin wires in the second inner layer and second outer layer. The motor stator 100a may have such wire configuration to provide an advantage of ease of ensuring the inclined gaps, e.g., Tb, between hairpin wires of the second inner layer and the second outer layer to meet the minimum safety insulation design requirements. That is, because the inclined gaps, e.g., Ta, between hairpin wires of the innermost layer and the outermost layer are smaller than the inclined gaps, e.g., Tb, between hairpin wires of the second inner layer and the second outer layer, it is more convenient to ensure that the minimum safety insulation design requirements are met in hairpin wires of all layers by merely checking if the inclined gaps, e.g., Ta, between hairpin wires of the innermost layer and the outermost layer meet the minimum safety insulation design requirements.

Show in the figures, the directions (115a, 115b) are opposite circumferential directions of the iron core 110, e.g., clockwise or counter-clockwise directions.

In this embodiment, the hairpin wires 120 and the hairpin wires 130 have uniform or the same dimensions, e.g., the sizes and dimensions of the hairpin wires 120, 130 are substantially the same, but not being limited thereto.

In this embodiment, each hairpin wire has insulating coating, e.g., as illustrated in FIG. 4A. Each hairpin wire 120 has its insulating coating 120d for it to be electrically insulated from adjacent hairpin wires and to avoid short-circuit. Leg ends (120e, 120f) are exposed from the insulating coating 120d to be welded and electrically connected.

Figure 5:
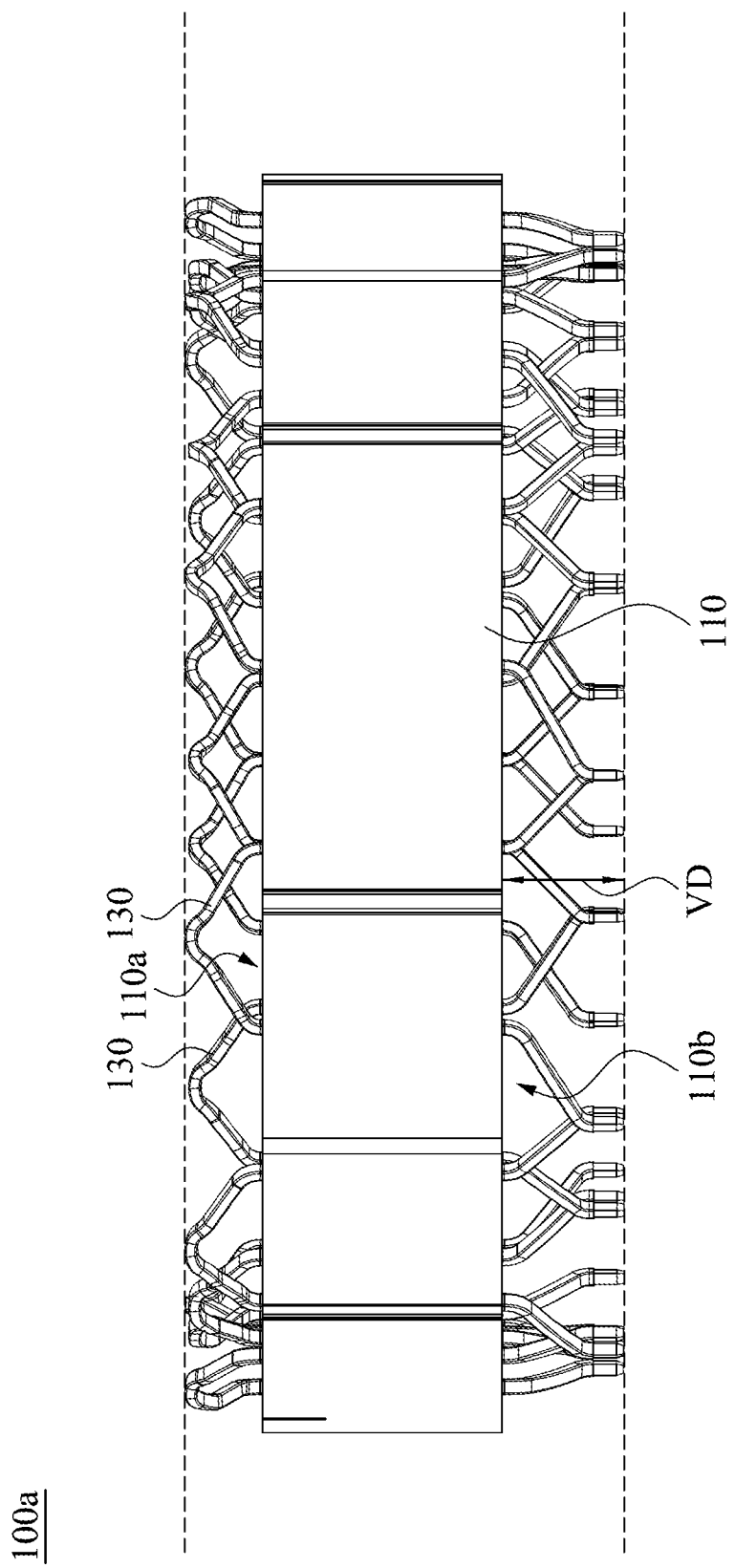
FIG. 5 illustrates a side view of the iron core with hairpin wires inserted as shown in FIG. 3.

In this embodiment, as illustrated in FIG. 5, the hairpin wires 120 have connected end surfaces of immediately-adjacent pairs of each first leg 120b and each second leg 120c that are equally distant from an end surface of the iron core 110, e.g., a distance VD, while the hairpin wires 130 have connected end surfaces of immediately-adjacent pairs of each leg 130b and each leg 130c that are equally distant from an end surface of the iron core 110, e.g., the distance VD, but not being limited thereto.

In other embodiments, when each slot is capable of accommodating more than four layers of wires, e.g., six or eight layers, more hairpin wires can be inserted into layers between the second inner layer and the second outer layer of each slot to form additional winding sets.

Figure 6:
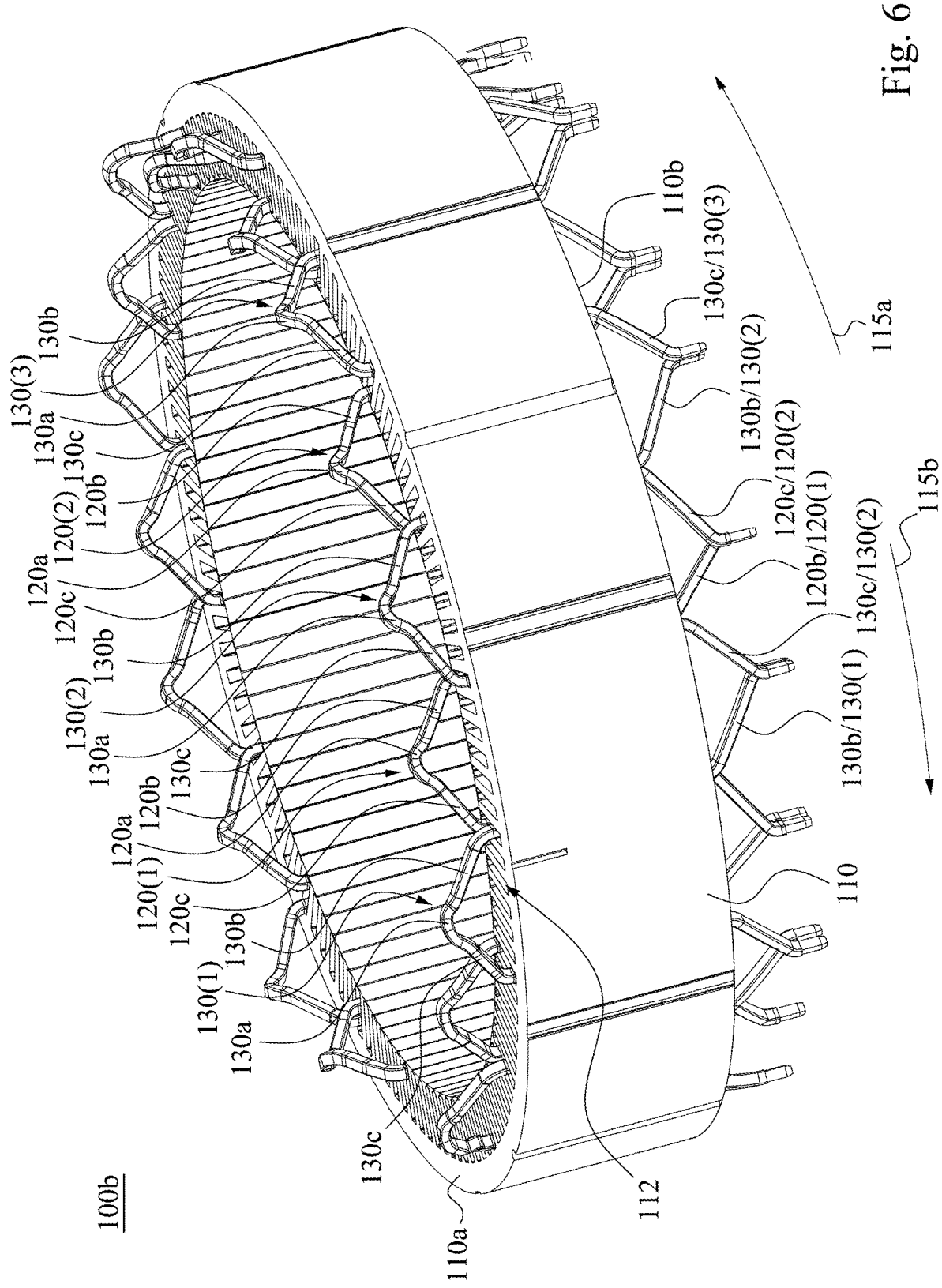
FIG. 6 illustrates a perspective view of an iron core in a motor stator according to another embodiment of the present disclosure.
Figure 7:
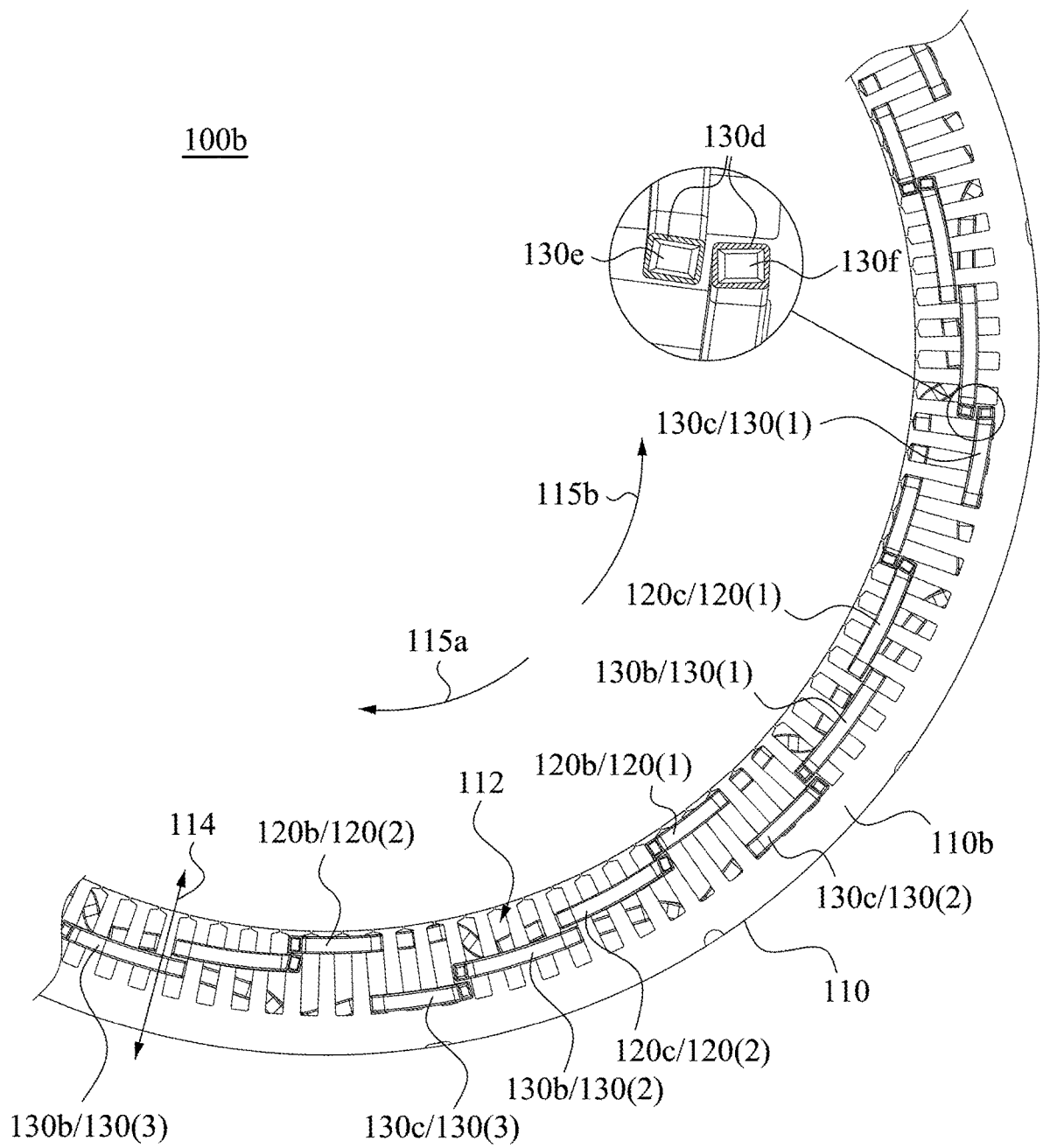
FIG. 7 illustrates a bottom view of the iron core with hairpin wires inserted as shown in FIG. 6.
Figure 8:
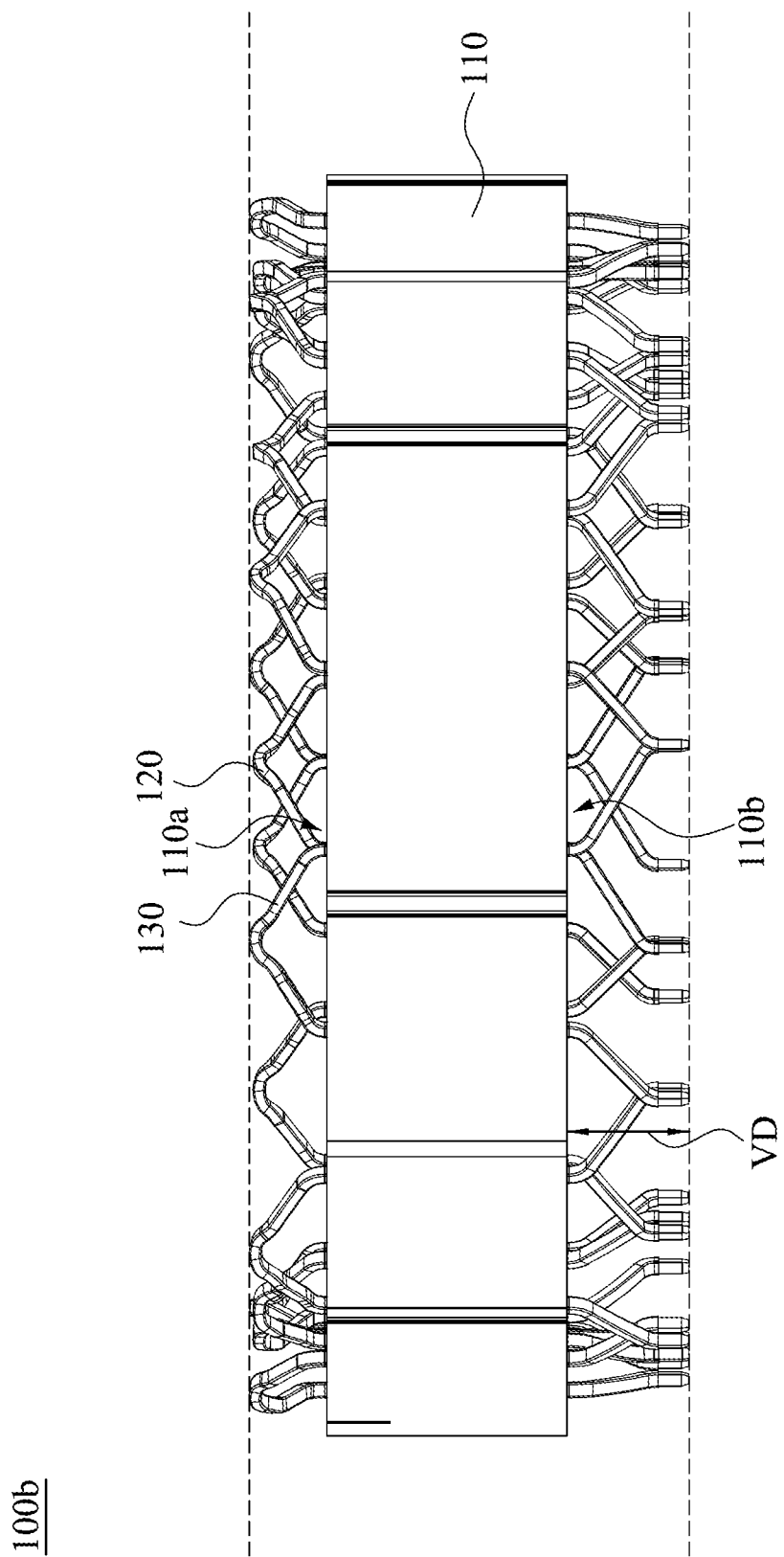
FIG. 8 illustrates a side view of the iron core with hairpin wires inserted as shown in FIG. 6.

Reference is made FIGS. 6-8 showing another embodiment of the present disclosure The motor stator 100b includes an iron core 110 and a plurality of hairpin wires inserted thereof. To better illustrate the configuration of the hairpin wires inserted into the iron core, bent, and connected, only a number of hairpin wires are illustrated here, instead of complete hairpin winding for example as shown in FIG. 1. The motor stator 100b is different from the previously described motor stator 100a in that the hairpin wires have a different configuration of span distances at the extension side of the iron core.

The motor stator 100b also includes a plurality of hairpin wires 120 and a plurality of hairpin wires 130. Each hairpin wire 120 has a U-shaped portion 120a and two legs (120b, 120c), and the U-shaped portion 120a interconnects between the two legs (120b, 120c). Each leg 120b is inserted into the innermost layer of the slots from the insertion side 110a of the iron core 110 and protruded out of the slots 112 from the extension side 110b of the iron core 110, and bent in a direction 115a and extended over a span distance. Each leg 120c is inserted into the second inner layer of the slots 112 from the insertion side 110a of the iron core 110 and protruded out of the slots from the extension side 110b of the iron core 110, and bent in a direction 115b and extended over a span distance.

In this embodiment, a span distance of each leg 120b across the slots in the innermost layer is smaller than a span distance of each leg 120c across the slots in the second inner layer. Each leg 120b is connected to an immediately-adjacent leg 120c to form a winding set, e.g., a leg 120b of the hairpin wire 120(1) is connected to an immediately-adjacent leg 120c of the hairpin wire 120(2) at the extension side 110b of the iron core 110 to form a winding set along the innermost layer and the second inner layer of the slots 112.

Each hairpin wire 130 has a U-shaped portion 130a and two legs (130b, 130c), and the U-shaped portion 130a interconnects between two legs (130b, 130c). Each leg 130b is inserted into the second outer layer of the slots 112 from the insertion side 110a of the iron core 110 and protruded out of the slots 112 from the extension side 110b of the iron core 110, and bent in the direction 115a and extended over a span distance. Each leg 130c is inserted into the outermost layer of the slots 112 from the insertion side 110a of the iron core 110 and protruded out of the slots from the extension side 110b of the iron core 110, and bent in a direction 115b and extended over a span distance.

In this embodiment, a span distance of each leg 130c across the slots in the outermost layer is smaller than a span distance of each leg 130b across the slots in the second outer layer. Each leg 130b is connected to an immediately-adjacent leg 130c to form a winding set, e.g., a leg 130b of the hairpin wire 130 (1) is connected to an immediately-adjacent leg 130c of the hairpin wire 130(2) at the extension side 110b of the iron core 110 to form a winding set along the outermost layer and the second outer layer of the slots 112.

As previously described and illustrated in FIG. 4B, when a hairpin wire has its span distance DB is smaller than its span distance DA, an inclined gap Tb is greater than an inclined gap Ta.

In this embodiment, because the span distance, e.g., DB, of each leg 120b across the slots in the innermost layer is smaller than the span distance, e.g., DA, of each leg 120c across the slots in the second inner layer, and the span distance of each leg 130c, e.g., DB, across the slots in the outermost layer is smaller than the span distance, e.g., DA, of each leg 130b across the slots in the second outer layer, an inclined gap, e.g., Tb, between adjacent hairpin wires in the innermost layer and outermost layer is greater than an inclined gap, e.g., Ta, between adjacent hairpin wires in the second inner layer and second outer layer. The motor stator 100b may have such wire configuration to provide an advantage of improved suitability for installing an oil cooling system. That is, because the inclined gaps between hairpin wires of the innermost layer and the outermost layer are greater than the inclined gaps between hairpin wires of the second inner layer and the second outer layer, the cooling oil fluid can more easily flow through the hairpin wires of the innermost layer and the outermost layer to reach the hairpin wires of the second inner layer and the second outer layer, and hairpin wires of all layers can be more easily immersed within the cooling oil fluid to enhance the heat dissipation efficiency.

Show in the figures, the directions (115a, 115b) are opposite circumferential directions of the iron core 110, e.g., clockwise or counter-clockwise directions.

In this embodiment, each hairpin wire has insulating coating, e.g., as illustrated in FIG. 7. Each hairpin wire 130 has its insulating coating 130d for it to be electrically insulated from adjacent hairpin wires and to avoid short-circuit. Leg ends (130e, 130f) are exposed from the insulating coating 130d to be welded and electrically connected.

In this embodiment, as illustrated in FIG. 8, the hairpin wires 120 have connected end surfaces of immediately-adjacent pairs of each first leg 120b and each second leg 120c that are equally distant from an end surface of the iron core 110, e.g., a distance VD, while the hairpin wires 130 have connected end surfaces of immediately-adjacent pairs of each leg 130b and each leg 130c that are equally distant from an end surface of the iron core 110, e.g., the distance VD, but not being limited thereto.

In some embodiments, in manufacturing process, each leg 120b of the hairpin wires 120 and each leg 130b of the hairpin wires 130 may be bent simultaneously in the same direction, i.e., the direction 115a, at the extension side 110b to speed up the process and reduce working hours. Similarly, each leg 120c of the hairpin wires 120 and each leg 130c of the hairpin wires 130 may also be bent simultaneously in the same direction, i.e., the direction 115b, at the extension side 110b to speed up the process and reduce working hours.

Figure 9A:
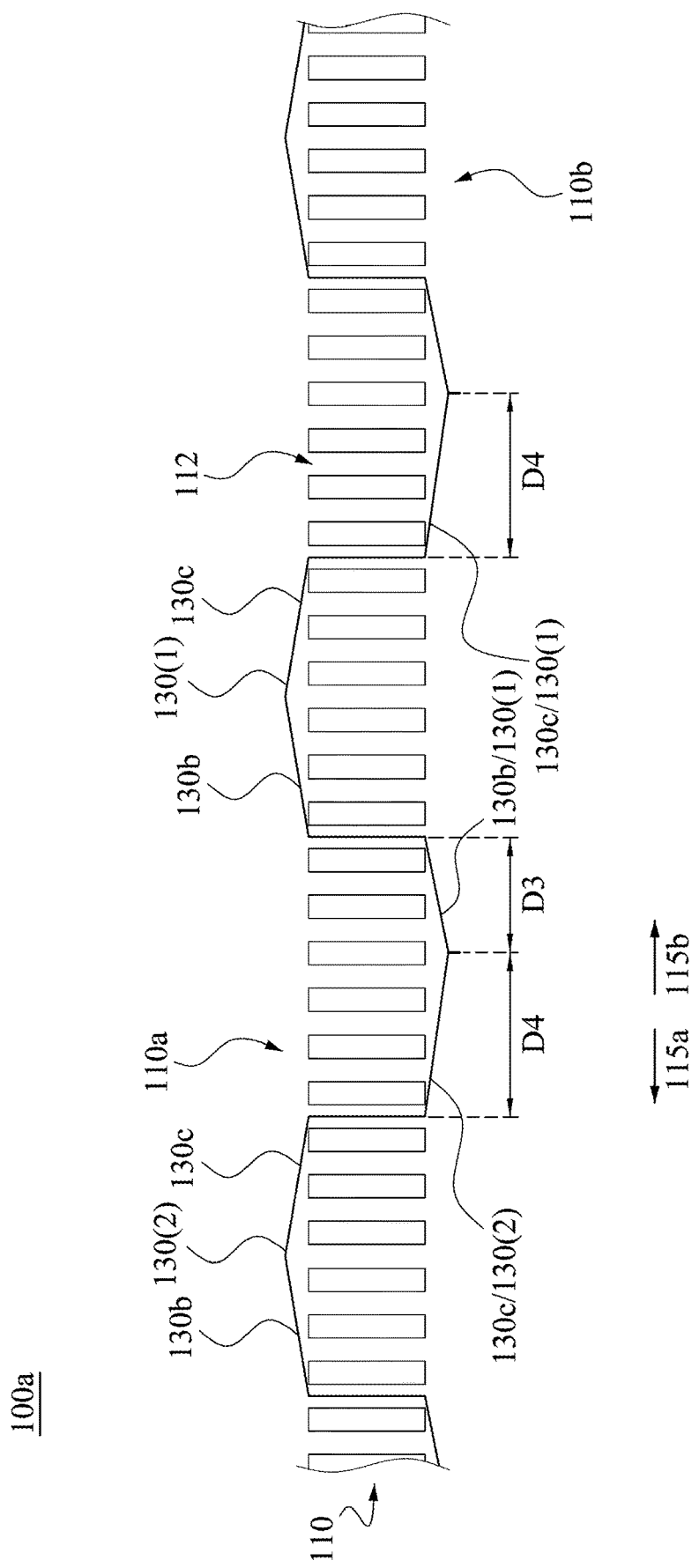
FIGS. 9A, 9B, 10A, 10B and 11 illustrate a wire winding configuration according to an embodiment of the present disclosure.
Figure 9B:
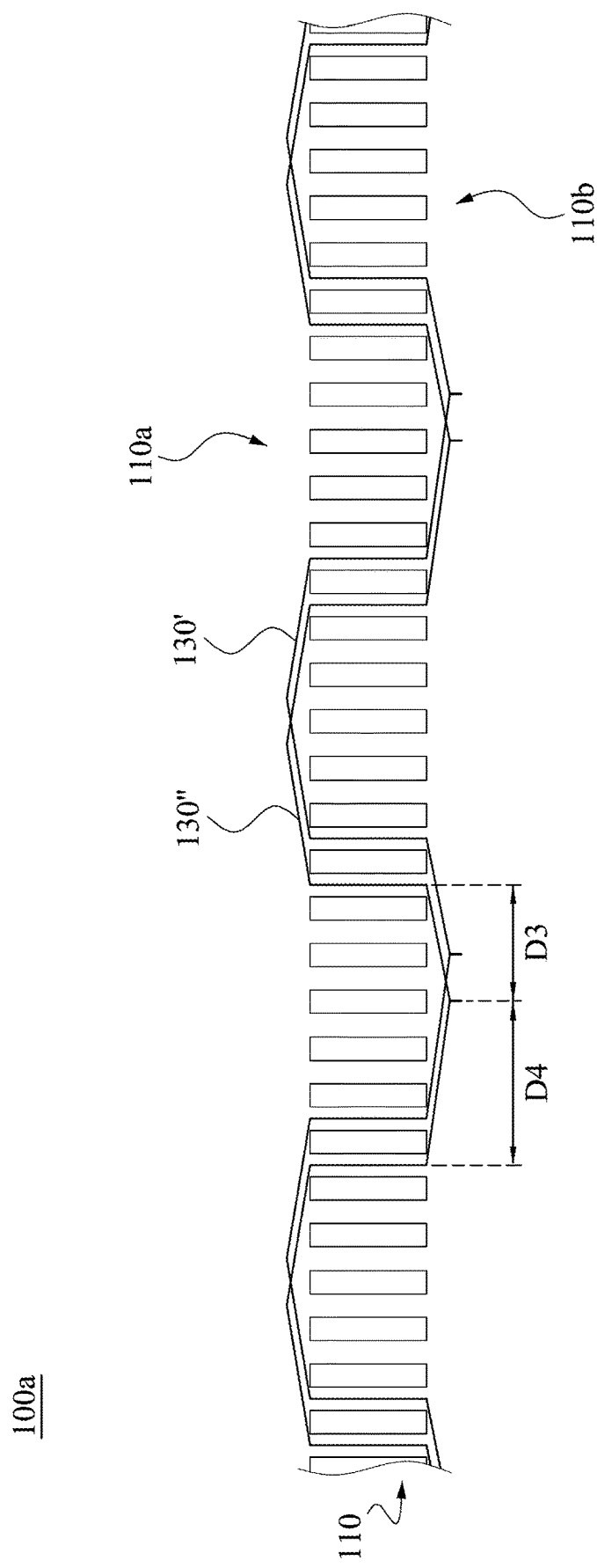

Reference is made to FIGS. 9A, 9B, 10A, 10B and 11, which illustrate a wire winding configuration of one of three phases of the motor stator 100a. As illustrated in FIG. 9A, a leg 130b of the hairpin wire 130(1) is inserted into the second outer layer of the slot, and protruded out from the extension side 110b of the iron core 110, and bent in the direction 115a and extended over a span distance D3 while a leg 130c of the hairpin wire 130 (2) is inserted into the outermost layer of the slot, and protruded out from the extension side 110b of the iron core 110, and bent in the direction 115b and extended over a span distance D4. The leg 130b of the hairpin wire 130(1) is connected with the immediately-adjacent leg 130c of the hairpin wire 130 (2) at the extension side 110b of the iron core 110, and the hairpin wires 130(1), 130(2) . . . in the outermost layer and the second outer layer of the slots are serially connected by the same configuration so as to form a winding set around the iron core 110, e.g., the winding set 130' shown in FIG. 9B. Similarly, another winding set 130" is formed adjacent to the winding set 130' as illustrated in FIG. 9B.

In this embodiment, the span distance D4, e.g., 3.5 slots, is greater than the span distance D3, e.g., 2.5 slots, but not being limited thereto.

Reference is also made to FIG. 11(a). The winding set 130' and the winding set 130" are offset by a slot, and a hairpin wire 130SP, which has a different dimension from the hairpin wire 130, is used to interconnect the winding set 130' and the winding set 130". As illustrated in FIG. 11(a), the hairpin wire 130SP has a leg inserted into the second outer layer of the slot and protruded out at the extension side and extended over a span distance D3, and then connected to an end of leg 1302' of the winding set 130'. In addition, the hairpin wire 130SP has another leg inserted into the outermost layer of the slot and protruded out at the extension side and extended over a span distance D4 and then connected to an end of leg 1301" of the winding set 130". Therefore, the winding set 130' and the winding set 130" are connected by the hairpin wire 130SP. In this embodiment, the hairpin wire 130SP has a total span distance across 5 slots which is less than 6 slots across which a total span distance of the hairpin wire 130 extends, but not being limited thereto.

In this embodiment, the motor stator 100a includes a terminal wire 132 (as illustrated in FIG. 1) to serve as a connection end for one of three phases winding set. The terminal wire 132 has an end at the insertion side 110a to be coupled with either one of the three phases, i.e., U phase, V phase or W phase, and another end at the extension side 110b to be coupled with the winding set 130'. In this embodiment, as illustrated in FIG. 11(a), the terminal wire 132 is inserted into the outermost layer of the slot and protruded out at the extension side and extended over a span distance D4, and then connected to an end of leg 1301' of the winding set 130'.

In this embodiment, an end leg 1302" of the winding set 130" is connected to a winding set along the second inner layer and the innermost layer by another hairpin wire 140 as illustrated in FIG. 11(b), which will be described later.

Figure 10A:
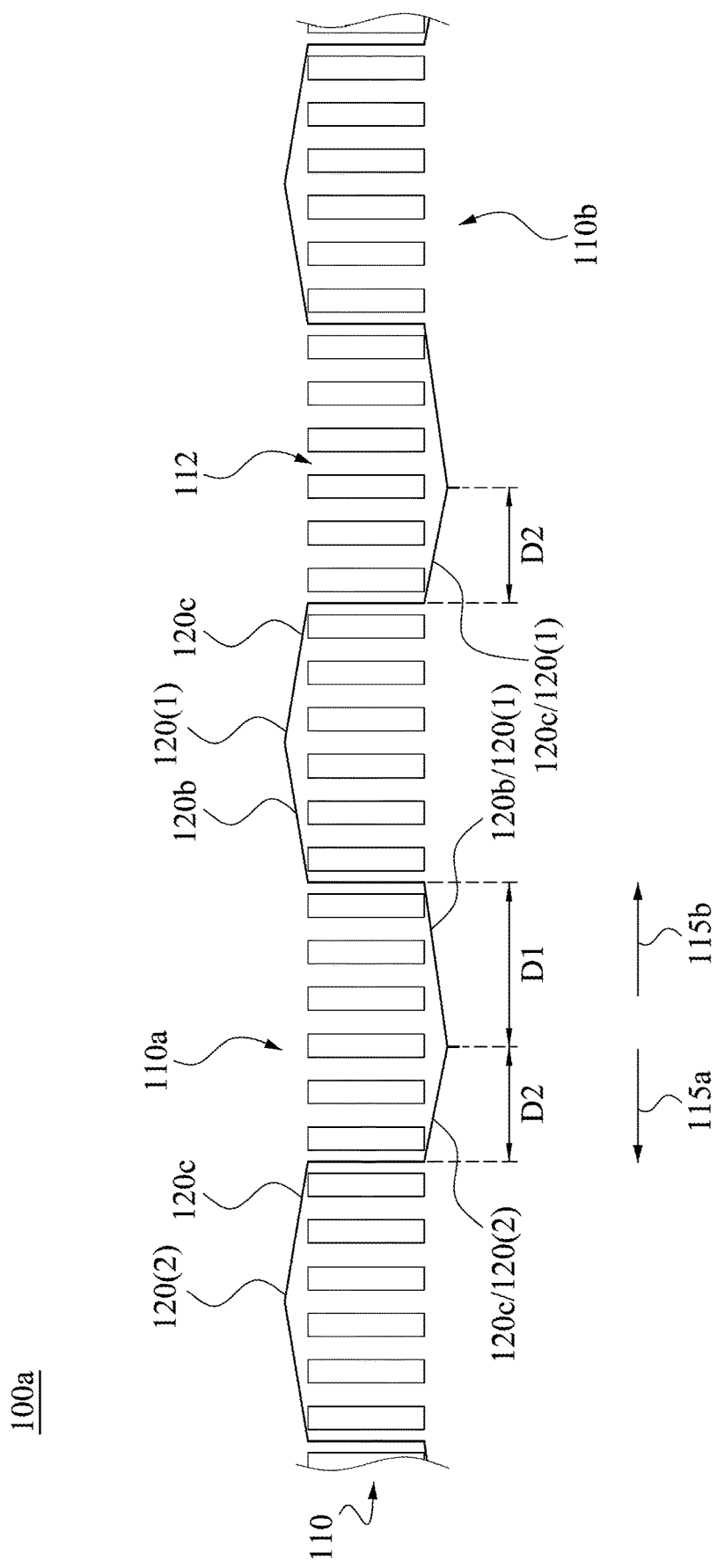
Figure 10B:
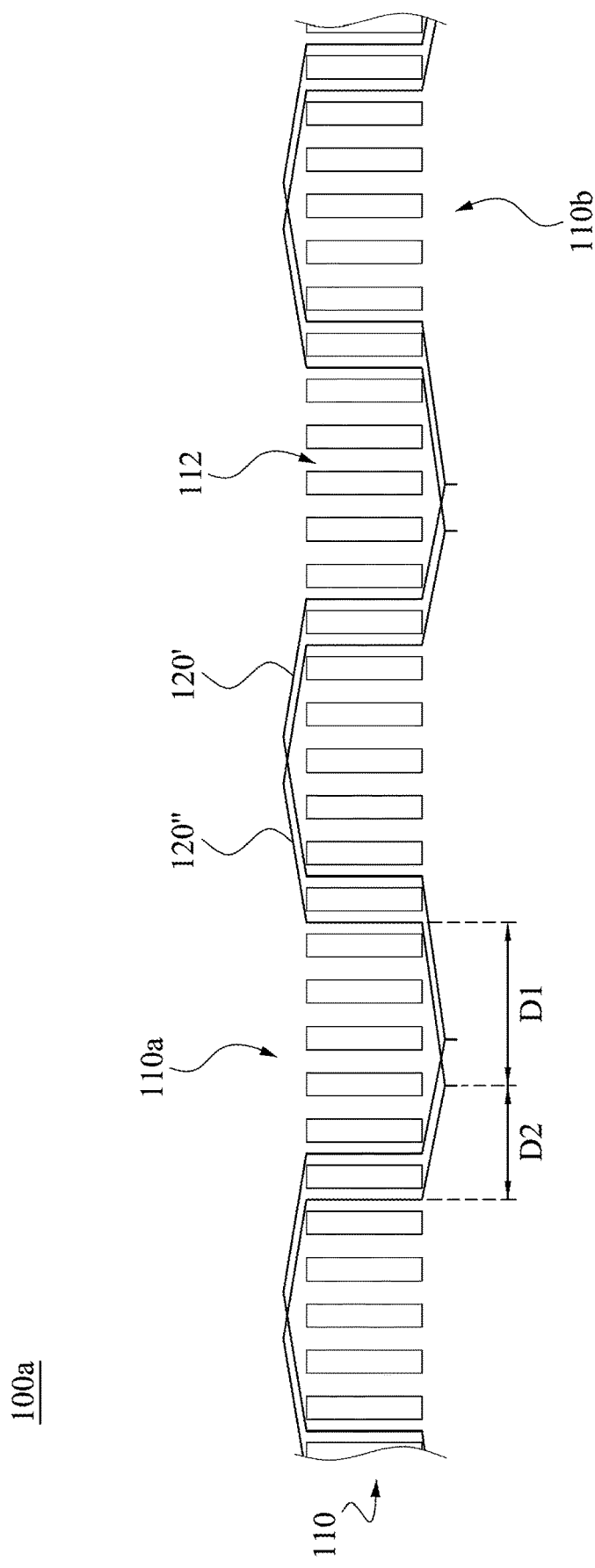

Reference is made to FIGS. 10A and 10B. As illustrated in FIG. 10A, the leg 120b of the hairpin wire 120(1) is inserted into the innermost layer of the slot and protruded out from the extension side 110b of the iron core, and bent in the direction 115a and extended over a span distance D1 and connected to an end of the leg 120c of the hairpin wire 120(2) that is inserted into the second inner layer of the slot and protruded out from the extension side 110b of the iron core, and bent in the direction 115b and extended over a span distance D2. The ends of the legs meet such that the leg 120b of the hairpin wire 120(1) is connected with the immediately adjacent leg 120c of the hairpin wire 120(2) at the extension side 110b of the iron core 110. The hairpin wires 120(1), 120(2) . . . in the innermost layer and the second inner layer of the slots are serially connected by the same configuration so as to form a winding set around the iron core 110, e.g., the winding set 120' in FIG. 10B. Similarly, another winding set 120" is formed adjacent to the winding set 120' as illustrated in FIG. 10B.

In this embodiment, the span distance D1, e.g., 3.5 slots, is greater than the span distance D2, e.g., 2.5 slots, but not being limited thereto.

As illustrated in FIG. 11(c), the winding sets (120', 120") are connected by a configuration similar to that of the winding sets (130', 130"), e.g., using a hairpin wire 120SP with a different dimension from that of the hairpin wire 120. As illustrated in FIG. 11(c), the hairpin wire 120SP has a leg inserted into the innermost layer of the slot and protruded out at the extension side and extended over a span distance D1, and then connected to an end of leg 1202' of the winding set 120'. In addition, the hairpin wire 120SP has another leg inserted into the second inner layer of the slot and protruded out at the extension side and extended over a span distance D2 and then connected to an end of leg 1201" of the winding set 120". Therefore, the winding set 120' and the winding set 120" are connected by the hairpin wire 120SP. In this embodiment, the hairpin wire 120SP has a total span distance across 5 slots which is less than 6 slots across which a total span distance of the hairpin wire 120 extends, but not being limited thereto.

Figure 11:
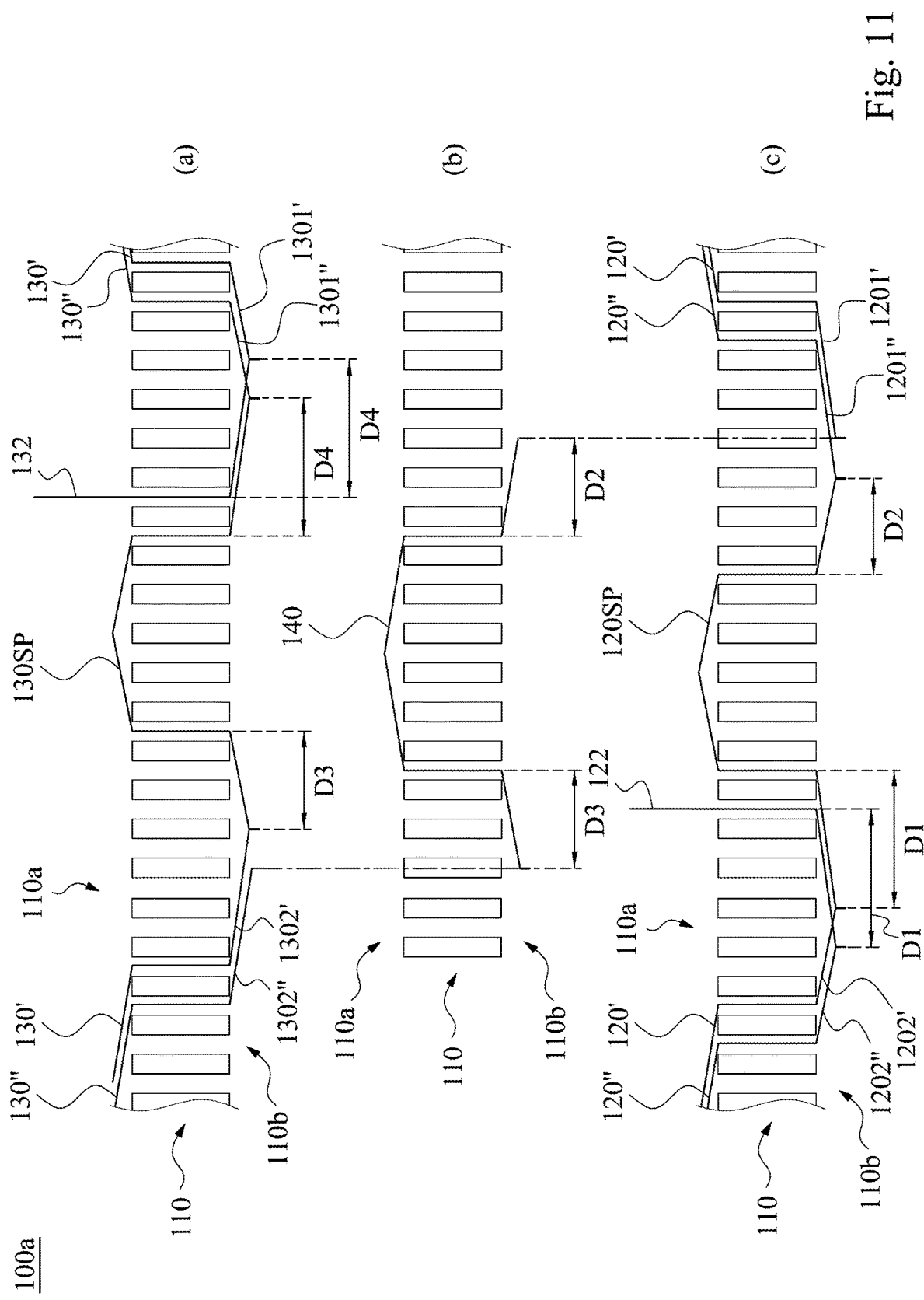

In this embodiment, motor stator 100*a* includes a neutral wire 122, as illustrated in FIG. 1, to serves as a neutral connection end of a three-phase winding set. The neutral wire 122 has an end at the insertion side 110*a* to be coupled with a neutral terminal and another end at the extension side 110*b* to be coupled with the winding set 120". In this embodiment, as illustrated in FIG. 11(*c*), the neutral wire 122 is inserted into the innermost layer of the slot and protruded out at the extension side and extended over a span distance D1, and then connected to an end of leg 1202" of the winding set 120".

In this embodiment, the motor stator 100*a* further includes a hairpin wire 140 to interconnect between the winding sets (130', 130") and the winding sets (120' and 120"). As illustrated in FIG. 11(*b*), the hairpin wire 140 has a leg inserted into the second outer layer of the slot and protruded out at the extension side and bent and extended over a span distance D3, and then connected to an end of leg 1302" of the winding set 130" that is inserted into the outermost layer of the slot. In addition, the hairpin wire 140 has another leg inserted into the second inner layer of the slot and protruded out at the extension side and bent and extended over a span distance D2, and then connected to an end of leg 1201' of the winding set 120' that is inserted into innermost layer of the slot. Accordingly, one of the three phases winding set for the motor stator 110*a* is completed. In this embodiment, the hairpin wire 140 may have the same dimensions as the hairpin wires (120, 130), e.g., a span distance across 6 slots width, but not being limited thereto. The hairpin wire 140 has its two legs extended over equal span distances D2 and D3, but not being limited thereto.

In this embodiment, the hairpin wire inserted into the innermost layer has an extended span distance D1 that is substantially equal to an extended span distance D4 of the hairpin wire inserted into the outermost layer, while the hairpin wire inserted into the second inner layer has an extended span distance D2 that is substantially equal to an extended span distance D3 of the hairpin wire inserted into the second outer layer. The span distance D1 is greater than the span distance D2, and the span distance D4 is greater than the span distance D3. Accordingly, the hairpin wires in the innermost layer and the outermost layer have inclined gaps smaller than inclined gaps of the hairpin wires in the second inner layer and the second outer layer (as illustrated in FIG. 4B). In this configuration, the inclined gaps of the second inner layer and the second outer layer, which could not be easily measured, can be indirectly determined as to whether the minimum safety insulation design requirements is met, by the previously mentioned techniques. That is, because inclined gaps of the hairpin wires in the innermost layer and the outermost layer are smaller than inclined gaps of the hairpin wires in the second inner layer and the second outer layer, it is more convenient to ensure that the minimum safety insulation design requirements are met in hairpin wires of all layers by merely checking if the inclined gaps between hairpin wires of the innermost layer and the outermost layer meet the minimum safety insulation design requirements.

In this embodiment, it is noted that each hairpin wire has its two legs bent and extended over unequal span distances except for the hairpin wire 140 so as to achieve the desired results. It is further noted that a sum of the first span distance (D1) and the second span distance (D2) may be substantially equal to a sum of the third span distance (D3) and the fourth span distance (D4), which may provide an optimal configuration for the hairpin legs connecting with corresponding immediately-adjacent hairpin legs.

It is noted that FIGS. 9A, 9B, 10A, 10B and 11 illustrate a wire winding set of one of three phases of the motor stator 100*a*, and the winding sets of other two phases can be formed by similar winding configurations. In addition, when the winding sets of U, V and W phases are completed, all the winding sets would have their neutral wires 122 electrically coupled to a neutral terminal at the insertion side so as to complete a three-phase stator winding set as illustrated in FIG. 1.

Figure 12A:
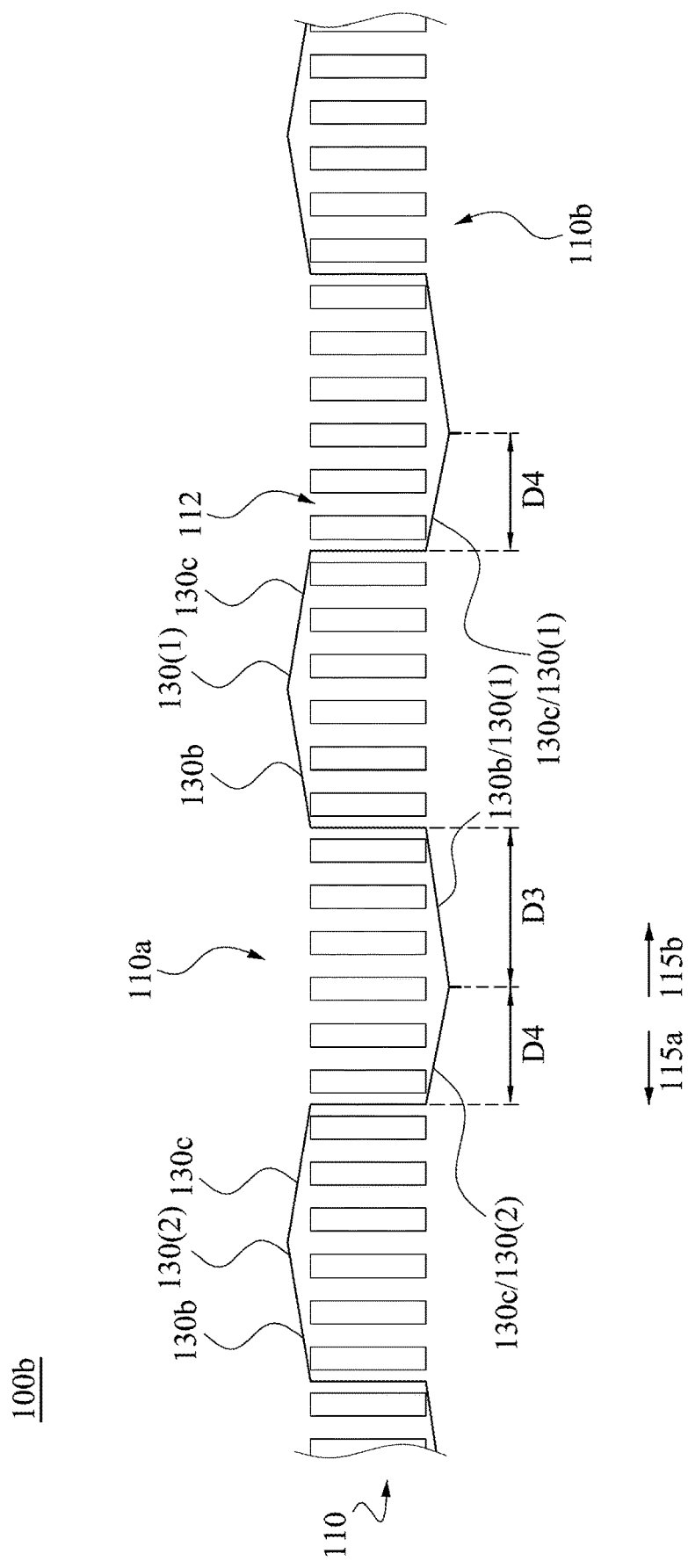
FIGS. 12A, 12B, 13A, 13B and 14 illustrate a wire winding configuration according to another embodiment of the present disclosure.
Figure 12B:
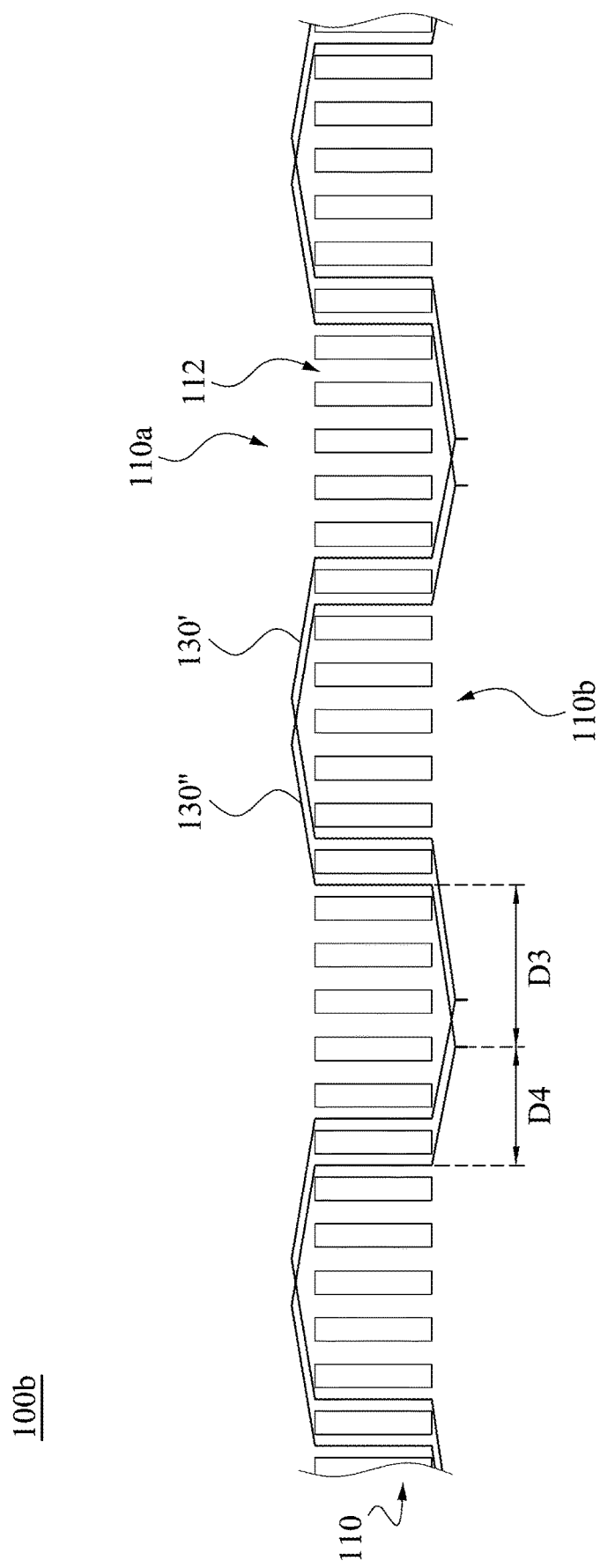

Reference is made to FIGS. 12A, 12B, 13A, 13B and 14, which illustrate a wire winding configuration of one of three phases of the motor stator 100*b*. As illustrated in FIG. 12A, a leg 130*b* of the hairpin wire 130(1) is inserted into the second outer layer of the slot, and protruded out from the extension side 110*b* of the iron core 110, and bent in the direction 115*a* and extended over a span distance D3 while a leg 130*c* of the hairpin wire 130 (2) is inserted into the outermost layer of the slot, and protruded out from the extension side 110*b* of the iron core 110, and bent in the direction 115*b* and extended over a span distance D4. The leg 130*b* of the hairpin wire 130(1) is connected with the immediately-adjacent leg 130*c* of the hairpin wire 130 (2) at the extension side 110*b* of the iron core 110, and the hairpin wires 130(1), 130(2) . . . in the outermost layer and the second outer layer of the slots are serially connected by the same configuration so as to form a winding set around the iron core 110, e.g., the winding set 130' in FIG. 12B. Similarly, another winding set 130" is formed adjacent to the winding set 130' as illustrated in FIG. 12B.

In this embodiment, the span distance D3, e.g., 3.5 slots, is greater than the span distance D4, e.g., 2.5 slots, but not being limited thereto.

Figure 14:
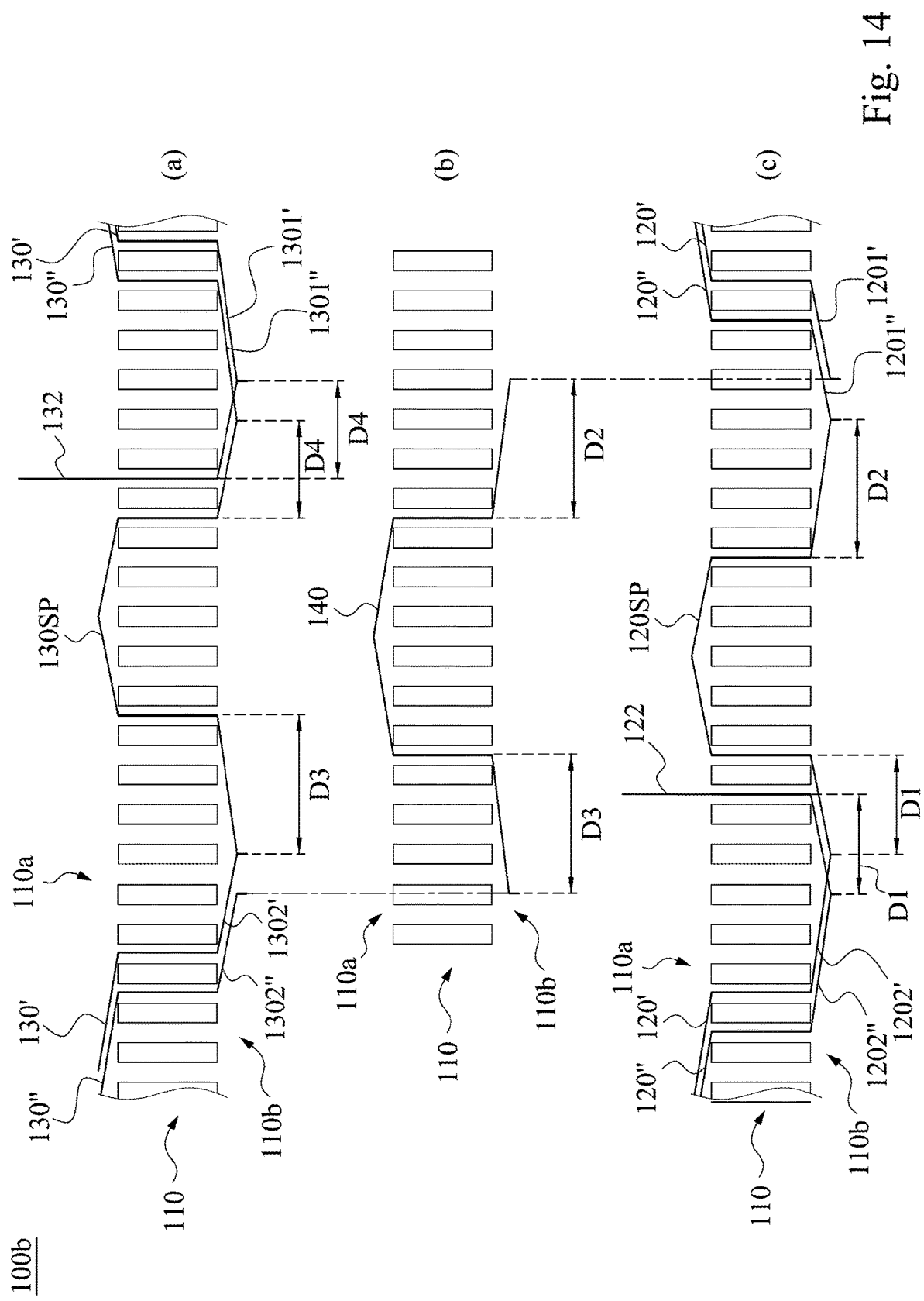

Reference is also made to FIG. 14(*a*). The winding set 130' and the winding set 130" are offset by a slot, and a hairpin wire 130SP, which has a different dimension from the hairpin wire 130, is used to interconnect the winding set 130' and the winding set 130". As illustrated in FIG. 14(*a*), the hairpin wire 130SP has a leg inserted into the second outer layer of the slot and protruded out at the extension side and extended over a span distance D3, and then connected to an end of leg 1302' of the winding set 130'. In addition, the hairpin wire 130SP has another leg inserted into the outermost layer of the slot and protruded out at the extension side and extended over a span distance D4 and then connected to an end of leg 1301" of the winding set 130". Therefore, the winding set 130' and the winding set 130" are connected by the hairpin wire 130SP. In this embodiment, the hairpin wire 130SP has a total span distance across 5 slots which is less than 6 slots across which a total span distance of the hairpin wire 130 extends, but not being limited thereto.

In this embodiment, the motor stator 100*b* includes a terminal wire 132 to serve as a connection end for one of three phases winding set. The terminal wire 132 has an end at the insertion side 110*a* to be coupled with either one of the three phase ends, i.e., U phase, V phase or W phase, and another end at the extension side 110b to be coupled with the winding set 130'. In this embodiment, as illustrated in FIG. 14(a), the terminal wire 132 is inserted into the outermost layer of the slot and protruded out at the extension side and extended over a span distance D4, and then connected to an end of leg 1301' of the winding set 130'.

In this embodiment, an end of leg 1302" of the winding set 130" is connected to a winding set along the second inner layer and the innermost layer by another hairpin wire 140 as illustrated in FIG. 14(b), which will be described later.

Figure 13A:
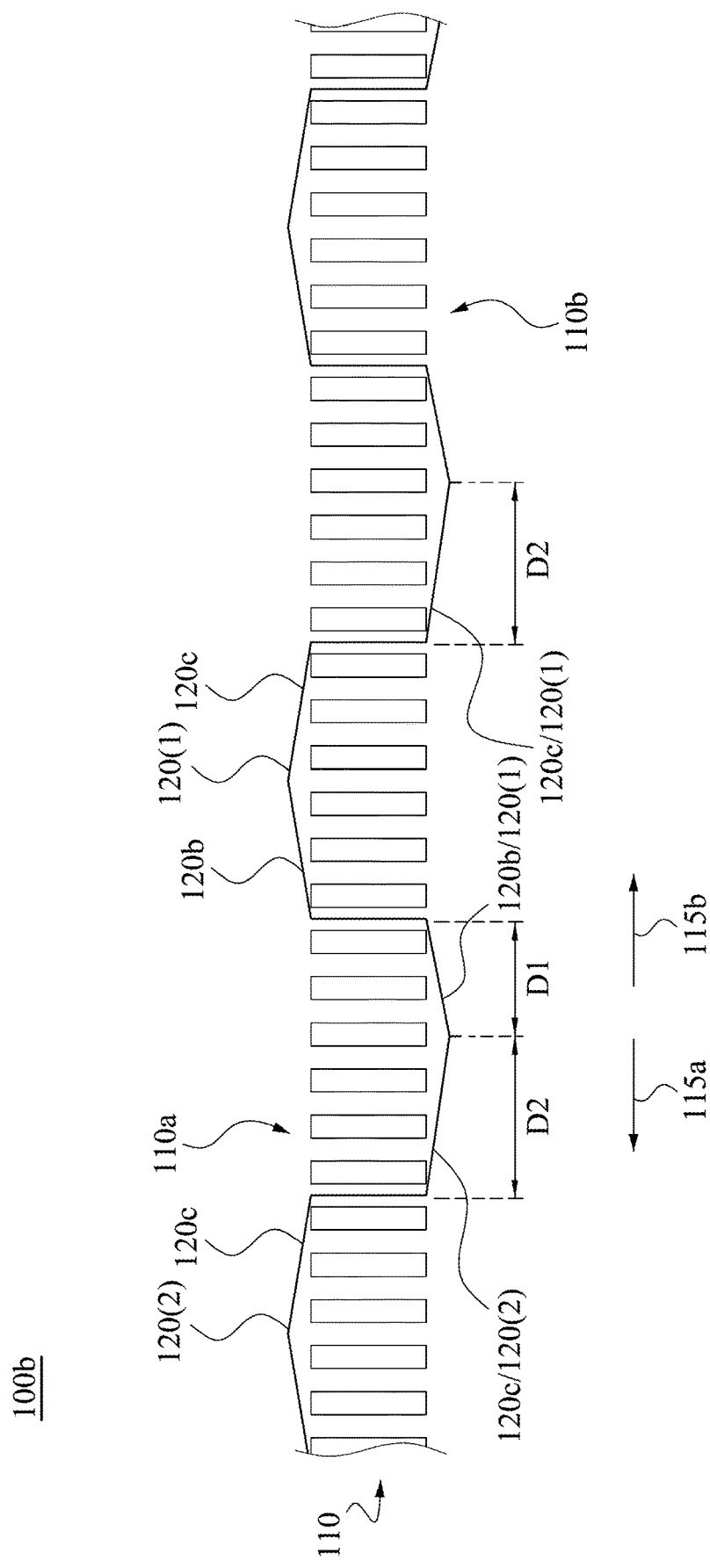
Figure 13B:
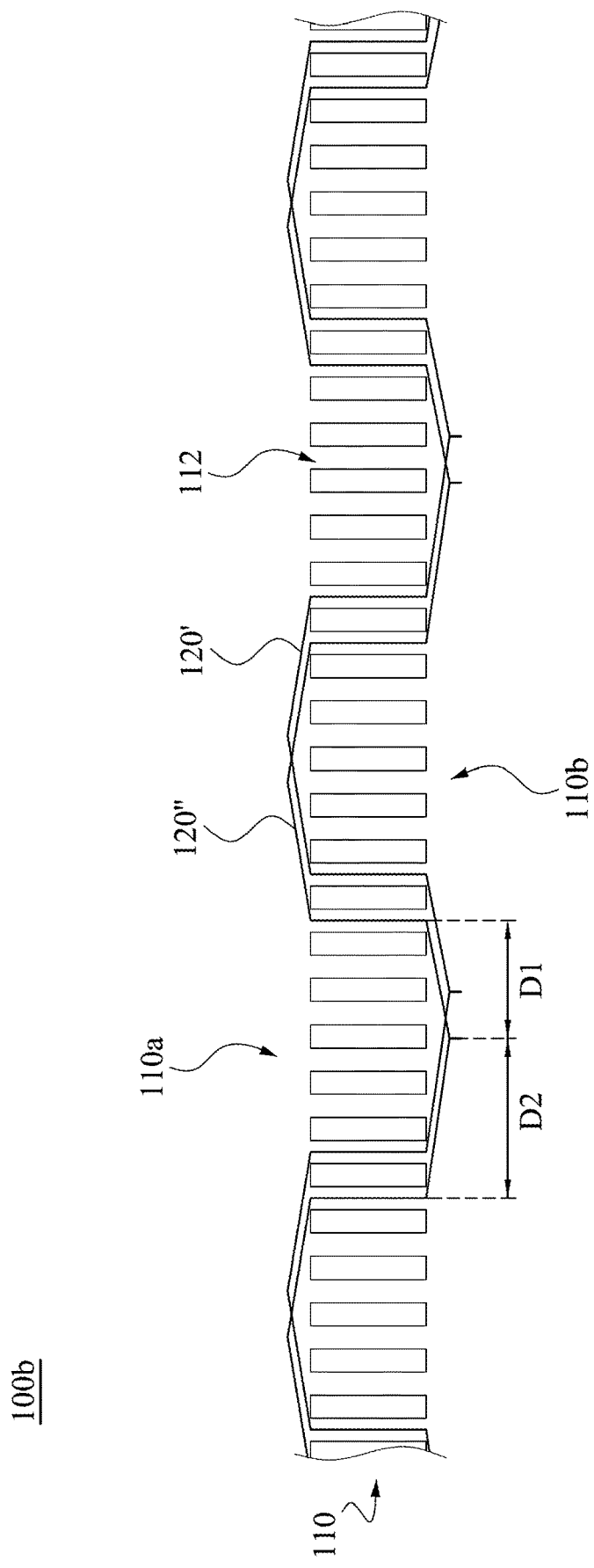

Reference is made to FIGS. 13A and 13B. As illustrated in FIG. 13A, the leg 120b of the hairpin wire 120(1) is inserted into the innermost layer of the slot and protruded out from the extension side 110b of the iron core, and bent in the direction 115a and extended over a span distance D1 and connected to an end of the leg 120c of the hairpin wire 120(2) that is inserted into the second inner layer of the slot and protruded out from the extension side 110b of the iron core, and bent in the direction 115b and extended over a span distance D2. The ends of the legs meet such that the leg 120b of the hairpin wire 120(1) is connected with the immediately adjacent leg 120c of the hairpin wire 120(2) at the extension side 110b of the iron core 110, and the hairpin wires 120(1), 120(2) . . . in the innermost layer and the second inner layer of the slots are serially connected by the same configuration so as to form a winding set around the iron core 110, e.g., the winding set 120' in FIG. 13B. Similarly, another winding set 120" is formed adjacent to the winding set 120' as illustrated in FIG. 13B.

In this embodiment, the span distance D2, e.g., 3.5 slots, is greater than the span distance D1, e.g., 2.5 slots, but not being limited thereto.

As illustrated in FIG. 14(c), the winding sets (120', 120") are connected by a configuration similar to that of the winding sets (130', 130"), e.g., using a hairpin wire 120SP with a different dimension from that of the hairpin wire 120. As illustrated in FIG. 14(c), the hairpin wire 120SP has a leg inserted into the innermost layer of the slot and protruded out at the extension side and extended over a span distance D1, and then connected to an end of leg 1202' of the winding set 120'. In addition, the hairpin wire 120SP has another leg inserted into the second inner layer of the slot and protruded out at the extension side and extended over a span distance D2 and then connected to an end of leg 1201" of the winding set 120". Therefore, the winding set 120' and the winding set 120" are connected by the hairpin wire 120SP. In this embodiment, the hairpin wire 120SP has a total span distance across 5 slots which is less than 6 slots across which a total span distance of the hairpin wire 120 extends, but not being limited thereto.

In this embodiment, the motor stator 100b includes a neutral wire 122 to serves as a neutral connection end of a three-phase winding set. The neutral wire 122 has an end at the insertion side 110a to be coupled with a neutral terminal and another end at the extension side 110b to be coupled with the winding set 120". In this embodiment, as illustrated in FIG. 14(c), the neutral wire 122 is inserted into the innermost layer of the slot and protruded out at the extension side and extended over a span distance D1, and then connected to an end of leg 1202" of the winding set 120".

In this embodiment, the motor stator 100b further includes a hairpin wire 140 to interconnect between the winding sets (130', 130") and the winding sets (120' and 120"). As illustrated in FIG. 14(b), the hairpin wire 140 has a leg inserted into the second outer layer of the slot and protruded out at the extension side and bent and extended over a span distance D3, and then connected to an end of leg 1302" of the winding set 130" that is inserted into the outermost layer of the slot. In addition, the hairpin wire 140 has another leg inserted into the second inner layer of the slot and protruded out at the extension side and bent and extended over a span distance D2, and then connected to an end of leg 1201' of the winding set 120' that is inserted into innermost layer of the slot. Accordingly, one of the three phases winding set for the motor stator 110b is completed. In this embodiment, the hairpin wire 140 may have the same dimensions as the hairpin wires (120, 130), e.g., a span distance across 6 slots width, but not being limited thereto. The hairpin wire 140 has its two legs extended over equal span distances D2 and D3, but not being limited thereto.

In this embodiment, the hairpin wire inserted into the innermost layer has an extended span distance D1 that is substantially equal to an extended span distance D4 of the hairpin wire inserted into the outermost layer while the hairpin wire inserted into the second inner layer has an extended span distance D2 that is substantially equal to an extended span distance D3 of the hairpin wire inserted into the second outer layer. The span distance D1 is smaller than the span distance D2, and the span distance D4 is smaller than the span distance D3. Accordingly, the hairpin wires in the innermost layer and the outermost layer have inclined gaps greater than inclined gaps of the hairpin wires in the second inner layer and the second outer layer. The motor stator 100b has such wire configuration to provide an advantage of improved suitability for installing an oil cooling system. That is, because the inclined gaps between hairpin wires of the innermost layer and the outermost layer are greater than the inclined gaps between hairpin wires of the second inner layer and the second outer layer, the cooling oil fluid can more easily flow through the hairpin wires of the innermost layer and the outermost layer to reach the hairpin wires of the second inner layer and the second outer layer, and hairpin wires of all layers can be more easily immersed within the cooling oil fluid to enhance the heat dissipation efficiency.

In this embodiment, it is noted that each hairpin wire has its two legs bent and extended over unequal span distances except for the hairpin wire 140 so as to achieve the desired results. It is further noted that a sum of the first span distance (D1) and the second span distance (D2) may be substantially equal to a sum of the third span distance (D3) and the fourth span distance (D4), which may provide an optimal configuration for the hairpin legs connecting with corresponding immediately-adjacent hairpin legs.

It is noted that FIGS. 12A, 12B, 13A, 13B and 14 illustrate a wire winding set of one of three phases of the motor stator 100b, and the winding sets of other two phases can be formed by similar winding configurations. In addition, when the winding sets of U, V and W phases are completed, all the winding sets would have their neutral wires 122 electrically coupled to a neutral terminal at the insertion side so as to complete a three-phase stator winding set.

Figure 15:
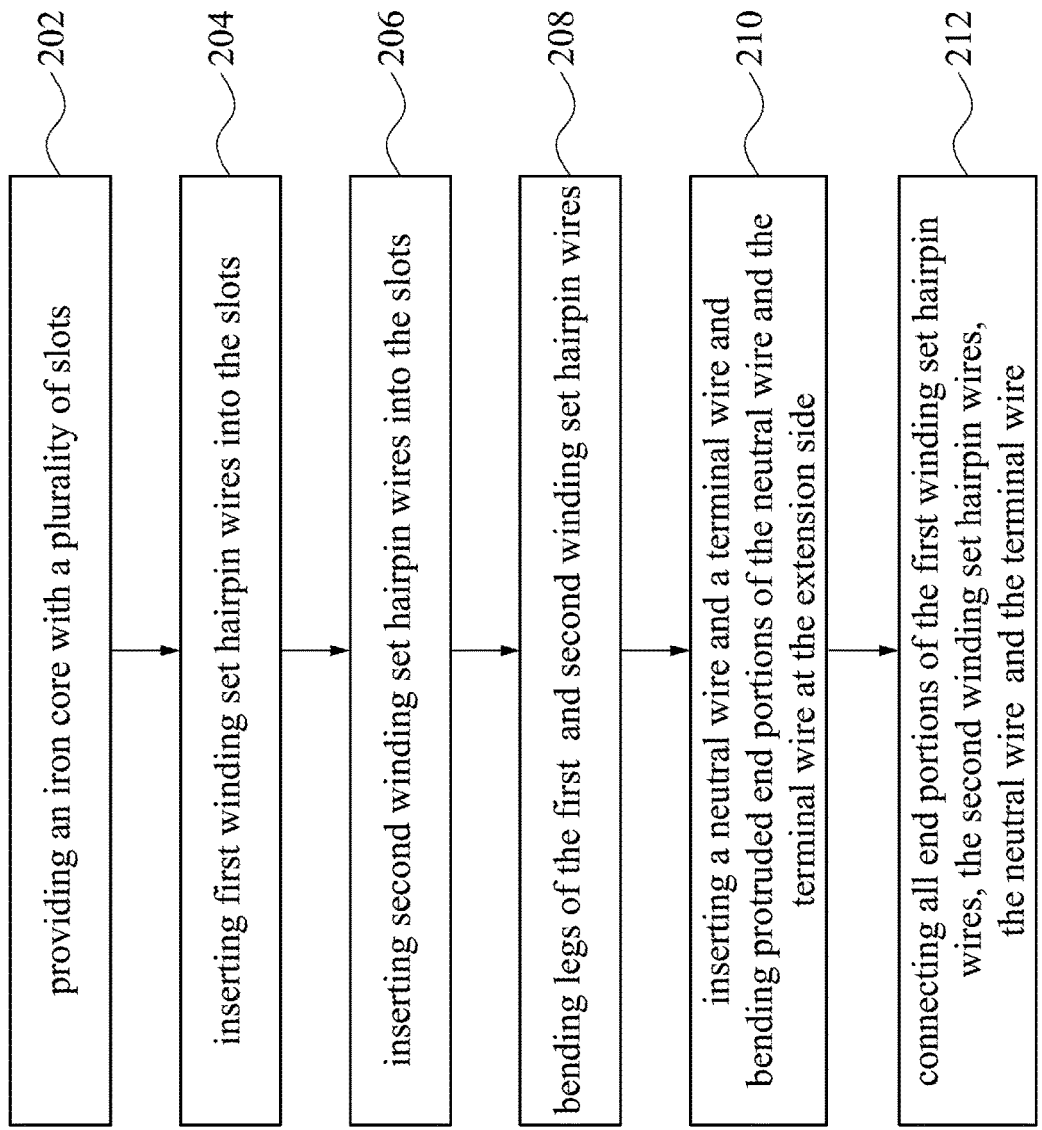
FIG. 15 illustrates steps of a motor stator forming method according to an embodiment of the present disclosure.

FIG. 15 illustrates steps of a motor stator forming method 200 according to an embodiment of the present disclosure. Referring to FIG. 15 and FIG. 2, step 202 is providing an iron core 110 with a plurality of slots 112. The iron core 110 has an insertion side 110a and an extension side 110b opposite to the insertion side. Each slot 112 has an innermost layer 112a, a second inner layer 112b, a second outer layer 112c and an outermost layer 112d, configured in a radial direction 114 of the iron core 110.

Referring to FIG. 15 and FIGS. 3-8, next, step 204 is inserting first winding set hairpin wires 120 into the slots 112. The first winding set hairpin wires 120 have first legs 120b inserted into the innermost layer 112a of the slots 112 from the insertion side 110a of the iron core 110 and protruded out from the extension side 110b of the iron core 110. The first winding set hairpin wires 120 have second legs 120c inserted into the second inner layer 112b of the slots 112 from the insertion side 110a of the iron core 110 and protruded out from the extension side 110b of the iron core 110.

In step 206 inserting second winding set hairpin wires 130 into the slots 112. The second winding set hairpin wires 130 have first legs 130b inserted into the second outer layer 112c of the slots 112 from the insertion side 110a of the iron core 110 and protruded out from the extension side 110b of the iron core 110. The second winding set hairpin wires 130 have second legs 130c inserted into the outermost layer 112d of the slots 112 from the insertion side 110a of the iron core 110 and protruded out from the extension side 110b of the iron core 110. It is noted than FIGS. 3-8 only illustrate a winding set of one of three phases of the motor stator, and in steps 204-206, inserting a plurality of first winding set hairpin wire and a plurality of second winding set hairpin wire means that each of the first winding set hairpin wire and the second winding set hairpin wire of each phase winding set of the three-phase winding set are inserted into the corresponding slots. Further, it is noted that the insertion of the first and second winding set hairpin wires (of all the phases) into the slots does not need to be sequential or in particular order. The leg ends of hairpin wires having first leg 130b and second leg 130c are preferably unbent prior to insertion into the slots. Both legs of the hairpin wires may be simultaneously inserted into their corresponding slots.

Next in step 208, bending each leg 120b such that it extends over a span distance D1 in the direction 115a, and bending each leg 120c such that it extends over a span distance D2 in the direction 115b. Also, bending each leg 130b such that it extends over a span distance D3 in the direction 115a, and bending each leg 130c such that it extends over a span distance D4 in the direction 115b. In the previously discussed embodiments of the motor stator 100a, the span distance D1 is substantially equal to the span distance D4, and the span distance D2 is substantially equal to the span distance D3. The span distance D1 is greater than the span distance D2, and the span distance D4 is greater than the span distance D3. In the previously discussed embodiments of the motor stator 100b, the span distance D1 is substantially equal to the span distance D4, and the span distance D2 is substantially equal to the span distance D3. The span distance D1 is smaller than the span distance D2, the span distance D4 is smaller than the span distance D3. It is similarly noted that the bending of the hairpin legs does not need to be sequential or in particular order. Also, the hairpin legs bent in the same direction may be simultaneously bent in an improved-efficiency manufacturing process. It is also envisaged that a further improved-efficiency manufacturing process may also be implemented, such that the bending of hairpin legs in one direction and the bending of the hairpin legs in the other direction are simultaneously carried out. For example, the bending of the hairpin leg may be carried out by applying a force to the hairpin leg such that the hairpin leg is caused to be bent in reaction to the applied force. To simultaneously bend multiple hairpin legs in the same direction, multiple forces may be applied correspondingly to multiple hairpin legs, wherein the forces are coordinated such that they are applied simultaneously. To simultaneously bend multiple hairpin legs in one direction and at the same time bending multiple hairpin legs in the other direction, two sets of multiple forces may be applied correspondingly to two sets of multiple hairpin legs. The application of the forces is coordinated such that they are applied simultaneously, so that one set of hairpin legs are bent in one direction in reaction to a corresponding set of multiple forces and the other set of hairpin legs are bent in reaction to the other corresponding set of multiple forces.

In step 210, with reference to FIGS. 1, 11 and 14, the neutral wire 122 and the terminal wire 132 are inserted into all slots of the iron core 110, and protruded end portions of the neutral wire 122 and the terminal wire 132 are bent at the extension side. As illustrated in FIGS. 11(c) and 14(c), the neutral wire 122 is inserted into the innermost layer of the slot and protruded out from the extension side 110b and extends over a span distance D1. As illustrated in FIGS. 11(a) and 14(a), the terminal wire 132 inserted into the outermost layer of the slot and protruded out from the extension side 110b and extends over a span distance D4.

In steps 204, 206, 210, inserting the first and second winding set hairpin wires, the neutral wires 122, and the terminal wires 132 into corresponding slots thereby arranges all the wires in all slots.

In some embodiments, bending each leg 120b, bending each leg 130b and bending the neutral wire 122 in the same direction 115a may be performed simultaneously to speed up manufacturing process and reduce working hours. The bending of each leg 120c, each leg 130c and terminal wire 132 in the same direction 115b may also be performed simultaneously to speed up manufacturing process and reduce working hours. For example, the first winding set hairpin wires, e.g., hairpin wires 120, the second winding set hairpin wire, e.g., hairpin wires 130, the neutral wire 122 and the terminal wire 132 are inserted into corresponding all slots, and then simultaneously bending each leg 120b of the first winding set hairpin wires, each leg 130b of the second winding set hairpin wires and the neutral wire 122, and simultaneously bending each leg 120c of the first winding set hairpin wires, each leg 130c of the second winding set hairpin wires and the terminal wire 132.

After the hairpin legs are bent, the ends of the hairpin legs are thus configured to be substantially aligned to one or more immediately-adjacent hairpin leg ends. In step 212, connecting all end portions of the first winding set hairpin wires 120, the second winding set hairpin wires 130, the neutral wire 122 and the terminal wire 132. In particular, immediately-adjacent pairs of leg end portions of the hairpin wire 120 are all connected to form the first winding set and immediately-adjacent pairs of leg end portions of hairpin wires 130 are all connected to form the second winding set. For example, as illustrated in FIGS. 9A, 10A, 12A and 13A, each leg 130b of the hairpin wire 130(1) has its end portion connected to an end portion of an immediately-adjacent leg 130c of the hairpin wire 130(2) at the extension side 110b of the iron core 110, and so on. Each leg 120b of the hairpin wire 120(1) has its end portion connected to an end portion of an immediately-adjacent leg 120c of the hairpin wire 120(2) at the extension side 110b of the iron core 110 and so on.

Further, as illustrated in FIGS. 11(c) and 14(c), the neutral wire 122 has its end portion connected to an end of leg 1202" of the first winding set. As illustrated in FIGS. 11(a) and 14(a), the terminal wire 132 has its end portion connected to an end of leg 1301' of the second winding set. All the wires form a configuration at the extension side as each wire protruded from the innermost layer has an end portion connected to an end portion of an immediately-adjacent wire protruded from the second inner layer, and each wire protruded from the second outer layer has an end portion connected to an end portion of an immediately-adjacent wire protruded from the outermost layer, so as to form a three-phase motor stator winding set as illustrated in FIG. 1. This configuration is advantageous for the manufacturing process stage of connecting the legs ends, for example by welding. An automated machine welding process may be implemented such that the "innermost layer-second inner layer" connection pair can be welded in one circumferential welding process round; and the "outermost layer-second outer layer" connection pair can also be welded in another one circumferential welding process round. In this way, improved manufacturing speed may be achieved and work hours may be reduced.

The motor stators disclosed herein has hairpin wires protruded from the extension side of the iron core and bent in different configurations or extended over different span distances along the innermost layer, the second inner layer, the second outer layer and the outermost layer of the slots. Enhanced heat dissipation efficiency and improvement to meeting the minimum safety insulation design requirements may be achieved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor stator comprising:
a core comprising a plurality of slots, an insertion side and an extension side opposite to the insertion side, wherein each slot comprises an innermost layer, a second inner layer, a second outer layer, and an outermost layer, configured in a radial direction of the core;
a plurality of hairpin wires configured to be inserted into the slots from the insertion side and protruded out of the slots from the extension side and bent in a circumferential direction of the core and extended over a span distance,
wherein the hairpin wires comprise a plurality of hairpin legs each inserted into one of the innermost layer, second inner layer, second outer layer, and outermost layer, wherein the hairpin legs protrude out at the extension side and are connected to form a winding set,
wherein the hairpin wires protruding out of the innermost layer extend over a first span distance, the hairpin wires protruding out of the second inner layer extend over a second span distance, the hairpin wires protruding out of the second outer layer extend over a third span distance, and the hairpin wires protruding out of the outermost layer extend over a fourth span distance, wherein the first span distance and the second span distance are different, and the third span distance and the fourth span distance are different,
and wherein the first span distance and the fourth span distance are substantially the same, and the second span distance and the third span distance are substantially the same,
wherein the hairpin wires comprise a first winding set having a plurality of hairpin wires each comprising a first leg protruding out of the innermost layer and a second leg protruding out of the second inner layer, wherein the first leg is bent in a first direction and extend the first span distance and the second leg is bent in a second direction and extend the second span distance, a plurality of immediately-adjacent pairs of the first leg and the second leg are connected to form the first winding set,
wherein the hairpin wires further comprise a second winding set having a plurality of hairpin wires each comprising a third leg protruding out of the second outer layer and a fourth leg protruding out of the outermost layer, wherein the third leg is bent in a third direction and extend the third span distance and the fourth leg is bent in a fourth direction and extend the fourth span distance, a plurality of immediately-adjacent pairs of the third leg and the fourth leg are connected to form the second winding set.

2. The motor stator of claim 1, wherein the first span distance is greater than the second span distance, and the fourth span distance is greater than the third span distance.

3. The motor stator of claim 1, wherein the first span distance is smaller than the second span distance, and the fourth span distance is smaller than the third span distance.

4. The motor stator of claim 1, further comprising:
at least one neutral wire configured to be connected to a neutral terminal; and
at least one terminal wire configured to be connected to at least one phase terminal,
wherein the first winding set, the second winding set, the neutral wire, and the terminal wire are inserted in the slots, and connected at the extension side to form a three-phase winding set,
wherein all the slots are inserted with the hairpin wires, and the neutral and terminal wires, such that a configuration at the extension side is formed comprising:
each wire protruding from the innermost layer comprises an end portion connected to an end portion of an immediately-adjacent wire protruding from the second inner layer; and
each wire protruding from the second outer layer comprises an end portion connected to an end portion of an immediately-adjacent wire protruding from the outermost layer.

5. The motor stator of claim 1, wherein the first direction and the third direction are of a same circumferential direction, and the second direction and the fourth direction are of a same circumferential direction.

6. The motor stator of claim 1, wherein a sum of the first span distance and the second span distance is substantially equal to a sum of the third span distance and the fourth span distance.

7. The motor stator of claim 1, wherein each immediately-adjacent pair of the first legs and the second legs is connected and forms an end surface of the first winding set, and wherein all end surfaces of the first winding set are substantially equally distant from an end surface of the core.

8. The motor stator of claim 1, wherein each immediately-adjacent pair of the third leg and the fourth leg is connected and forms an end surface of the second winding set, and wherein all end surfaces of the second winding set are substantially equally distant from an end surface of the core.

9. A motor stator comprising:
a core comprising a plurality of slots, an insertion side and an extension side opposite to the insertion side, wherein each slot comprises a first layer, a second layer, a third layer, and a fourth layer, configured from inner to outer in a radial direction of the core;

a plurality of first winding set hairpin wires, each wire comprising a first leg and a second leg, wherein each first leg is inserted into the first layer of the slots from the insertion side and protruded out of the slots from the extension side and bent in a first direction and extended over a first span distance, wherein each second leg is inserted into the second layer of the slots from the insertion side and protruded out of the slots from the extension side and bent in a second direction and extended over a second span distance, wherein the first span distance is different from the second span distance, and wherein an immediately-adjacent pair of the first leg and the second leg is connected to form a first winding set; and a plurality of second winding set hairpin wires, each wire comprising a third leg and a fourth leg, wherein each third leg is inserted into the third layer of the slots from the insertion side and protruded out of the slots from the extension side and bent in a third direction and extended over a third span distance, wherein each fourth leg is inserted into the fourth layer of the slots from the insertion side and protruded out of the slots from the extension side and bent in a fourth direction and extended over a fourth span distance, wherein the third span distance is different from the fourth span distance, and wherein an immediately-adjacent pair of the fourth leg and the third leg is connected to form a second winding set, wherein the first layer is an innermost layer of the slot, and the fourth layer is an outermost layer of the slot, and wherein the first span distance and the fourth span distance are substantially the same.

10. The motor stator of claim 9, wherein a size and dimension of the first winding set hairpin wires is substantially the same as a size and dimension of the second winding set hairpin wires.

11. The motor stator of claim 9, wherein the first direction and the third direction are of the same circumferential direction, and the second direction and the fourth direction are of the same circumferential direction.

12. The motor stator of claim 9, wherein the first and second winding set hairpin wires all comprise an insulating coating and further comprise leg ends exposed from the insulating coating.

13. A motor stator forming method comprising:
providing a core comprising a plurality of slots, an insertion side and an extension side opposite to the insertion side, wherein each slot comprises an innermost layer, a second inner layer, a second outer layer, and an outermost layer, configured in a radial direction of the core;
inserting a plurality of first winding set hairpin wires into the slots from the insertion side and protruding a plurality of first and second legs of the first winding set hairpin wires out of the slots from the extension side, wherein the plurality of first legs protrude out of the innermost layer of the slots and the plurality of second legs protrude out of the second inner layer of the slots;
inserting a plurality of second winding set hairpin wires into the slots from the insertion side and protruding a plurality of third and fourth legs of the second winding set hairpin wires out of the slots from the extension side, wherein the plurality of third legs protrude out of the second outer layer of the slots and the plurality of fourth legs protrude out of the outermost layer of the slots;
bending each of the first legs in a first direction such that it extends over a first span distance;
bending each of the second legs in a second direction such that it extends over a second span distance;
bending each of the third legs in a third direction such that it extends over a third span distance; and
bending each of the fourth legs in a fourth direction such that it extends over a fourth span distance,
wherein the first span distance is different from the second span distance and the third span distance is different from the fourth span distance, and wherein
the first span distance is substantially equal to the fourth span distance and the second span distance is substantially equal to the third span distance,
connecting a plurality of immediately-adjacent pairs of the first leg and the second leg to form a first winding set and
connecting a plurality of immediately-adjacent pairs of the third leg and the fourth leg to form a second winding set.

14. The method of claim 13, wherein the first direction and the third direction are of the same circumferential direction, and the second direction and the fourth direction are of the same circumferential direction.

15. The method of claim 13, wherein the first span distance is greater than the second span distance, and the fourth span distance is greater than the third span distance.

16. The method of claim 13, wherein the first span distance is smaller than the second span distance, and the fourth span distance is smaller than the third span distance.

17. The method of claim 13, wherein
the bending of each of the first legs and each of the third legs is performed simultaneously; and
the bending of each of the second legs and each of the fourth legs is performed simultaneously.

18. The method of claim 13 further comprising:
inserting at least one neutral wire and at least one terminal wire to configure the motor stator to comprise the first winding set hairpin wires, the second winding set hairpin wires, the at least one neutral wire and the at least one terminal wire inserted in all the slots, wherein the at least one neutral wire is configured to be connected to a neutral terminal, and the at least one terminal wire is configured to be connected to at least one phase terminal;
bending an end portion of the at least one neutral wire;
bending an end portion of the at least one terminal wire;
connecting, at the extension side, a plurality of end portions of all of the first legs, second legs, third legs, fourth legs, and all end portions of the at least one neutral wire and the at least one terminal wire to form a configuration at the extension side comprising:
each wire protruding from the innermost layer comprises an end portion connected to an end portion of an immediately-adjacent wire protruding from the second inner layer; and
each wire protruding from the second outer layer has an end portion connected to an end portion of an immediately-adjacent wire protruding from the outermost layer.

* * * * *